(12) United States Patent
Park et al.

(10) Patent No.: US 9,495,932 B2
(45) Date of Patent: *Nov. 15, 2016

(54) DISPLAY DEVICE

(71) Applicant: Samsung Display Co., Ltd, Yongin-si, Gyeonggi-do (KR)

(72) Inventors: Kee-Bum Park, Cheonan-si (KR); Kyung Ho Kim, Bucheon-si (KR); (Continued)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,949

(22) Filed: Mar. 1, 2016

(65) Prior Publication Data

US 2016/0180790 A1    Jun. 23, 2016

Related U.S. Application Data

(63) Continuation of application No. 13/725,684, filed on Dec. 21, 2012, now Pat. No. 9,305,508.

(30) Foreign Application Priority Data

Jul. 24, 2012    (KR) .......................... 10-2012-0080794

(51) Int. Cl.
*G09G 3/36* (2006.01)
*G02F 1/1345* (2006.01)
(Continued)

(52) U.S. Cl.
CPC .......... *G09G 3/3677* (2013.01); *G02F 1/13454* (2013.01); *G09G 3/20* (2013.01); (Continued)

(58) Field of Classification Search
CPC ................ G09G 3/3677; G09G 3/3648; G09G 3/3614; G09G 2300/0426; G09G (Continued)

(56) References Cited

U.S. PATENT DOCUMENTS

| 4,368,467 A | 1/1983 | Unotoro et al. |
| 6,175,351 B1 | 1/2001 | Matsuura et al. |
| | (Continued) | |

FOREIGN PATENT DOCUMENTS

| JP | 2002-182232 A | 6/2002 |
| JP | 2007-193340 A | 8/2007 |
| | (Continued) | |

OTHER PUBLICATIONS

EP Search Report for EP 12197640 dated Dec. 20, 2013.
Extended EP Search Report for EP 12197640 dated May 9, 2014.

*Primary Examiner* — Dmitriy Bolotin
(74) *Attorney, Agent, or Firm* — Innovation Counsel LLP

(57) ABSTRACT

A substantially rectangular display panel includes a first edge extending in a first major axis direction of the rectangular shape and a second edge extending in a second major axis direction of the rectangular shape, the second direction being different from the first direction. The display panel includes: a plurality of gate lines extending in the first direction; and a gate lines driver including a plurality of main stages sequentially connected to each other and configured for outputting gate signals to the gate lines, where the plurality of stages further includes one or more dummy stages arranged in a row along the second edge and not connected to the plurality of gate lines, and where a layout arrangement of a plurality of thin film transistors included in the main stage is different from a corresponding layout arrangement of corresponding thin film transistors included in the at least one dummy stage.

22 Claims, 14 Drawing Sheets

(72) Inventors: Hyuk-Jin Kim, Asan-si (KR); Dong Hee Shin, Cheonan-si (KR); Byoung Sun Na, Hwaseong-si (KR)

(51) Int. Cl.
*G09G 3/20* (2006.01)
*G09G 3/34* (2006.01)

(52) U.S. Cl.
CPC ........ *G09G 3/34* (2013.01); *G09G 2300/0408* (2013.01); *G09G 2300/0413* (2013.01); *G09G 2300/0426* (2013.01); *G09G 2310/0267* (2013.01); *G09G 2310/0281* (2013.01)

(58) Field of Classification Search
CPC ...................... 3/3688;G09G 2310/0286; G09G 2300/0408; G09G 2310/0267; G09G 3/3266; G09G 2300/0413; G09G 3/34; G09G 3/20; G09G 2310/0281; G02F 1/13454
USPC .................................................. 345/76–104
See application file for complete search history.

(56) References Cited

U.S. PATENT DOCUMENTS

| | | |
|---|---|---|
| 6,774,957 B2 | 8/2004 | Jinno et al. |
| 8,004,624 B2 | 8/2011 | Kil |
| 8,860,648 B2 | 10/2014 | Lee et al. |
| 2003/0189542 A1 | 10/2003 | Lee et al. |
| 2003/0227433 A1 | 12/2003 | Moon |
| 2004/0189585 A1 | 9/2004 | Moon |
| 2004/0246246 A1 | 12/2004 | Tobita |
| 2006/0161693 A1 | 7/2006 | Lee et al. |
| 2006/0221041 A1 | 10/2006 | Cho et al. |
| 2006/0221042 A1 | 10/2006 | Cho et al. |
| 2006/0227094 A1 | 10/2006 | Park et al. |
| 2007/0001991 A1 | 1/2007 | Jang et al. |
| 2007/0164954 A1 | 7/2007 | Yang et al. |
| 2008/0122774 A1 | 5/2008 | Jo et al. |
| 2008/0211760 A1 | 9/2008 | Baek et al. |
| 2011/0063267 A1 | 3/2011 | Sim et al. |
| 2011/0141073 A1 | 6/2011 | Liu et al. |
| 2011/0148954 A1 | 6/2011 | Tobita et al. |
| 2013/0106677 A1 | 5/2013 | Koo et al. |
| 2013/0321499 A1 | 12/2013 | Park et al. |
| 2014/0104149 A1 | 4/2014 | Lee et al. |

FOREIGN PATENT DOCUMENTS

| | | |
|---|---|---|
| JP | 2010-272664 A | 12/2010 |
| JP | 2011-128520 A | 6/2011 |
| KR | 10-2008-0099960 A | 11/2008 |
| KR | 10-2008-0109159 A | 12/2008 |
| KR | 10-2009-0013623 A | 2/2009 |
| KR | 10-2009-0123495 A | 12/2009 |
| KR | 10-2011-0032341 A | 3/2011 |

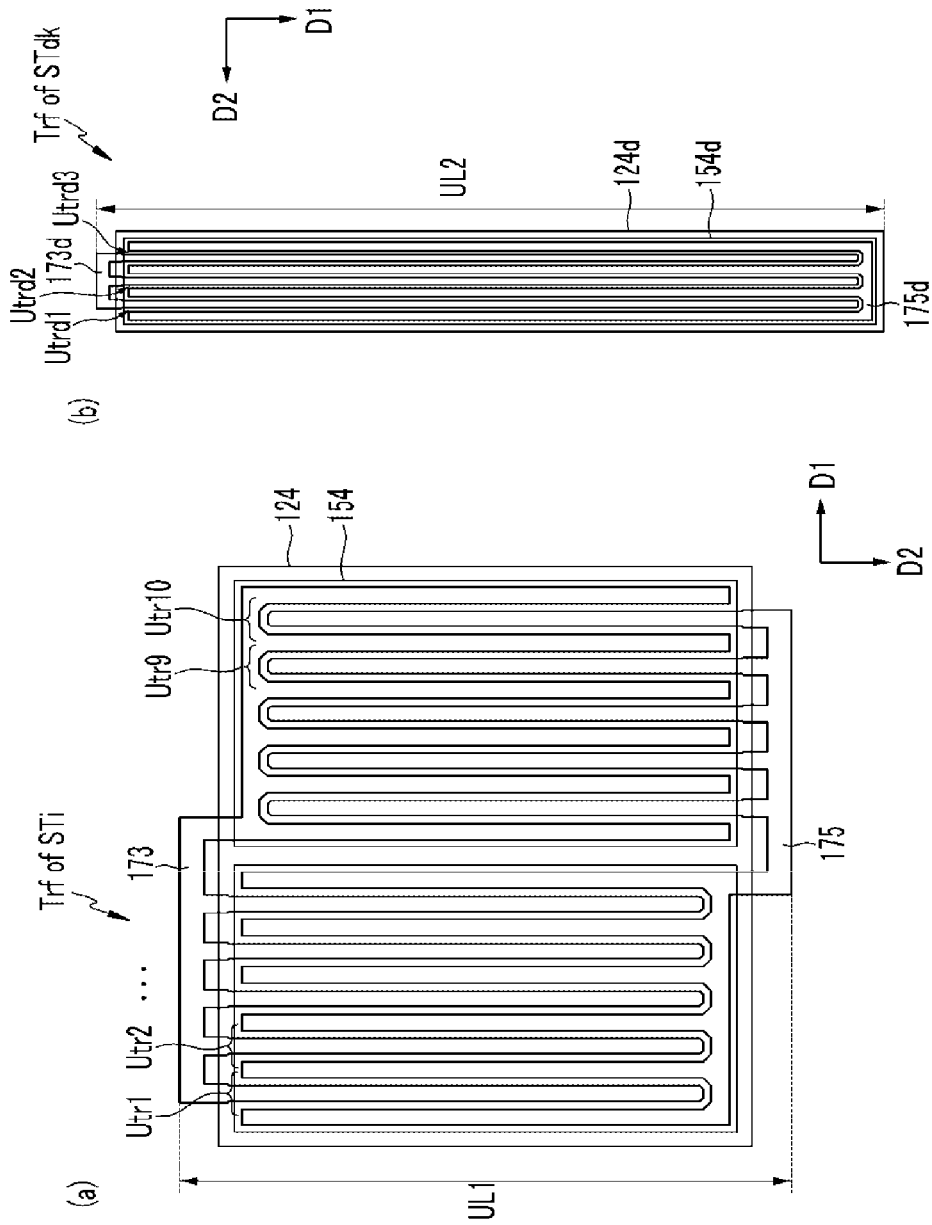

FIG.8
(a)
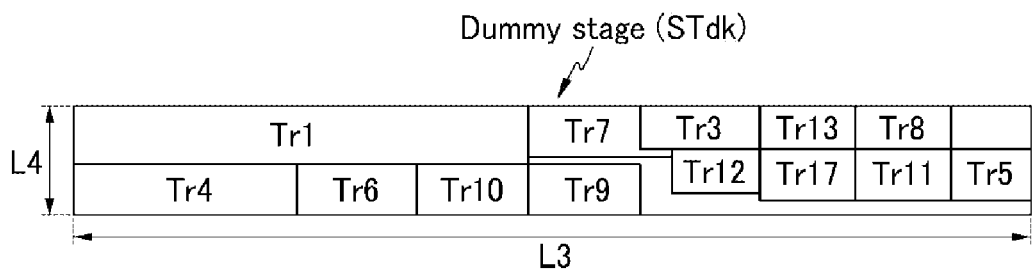
(b)
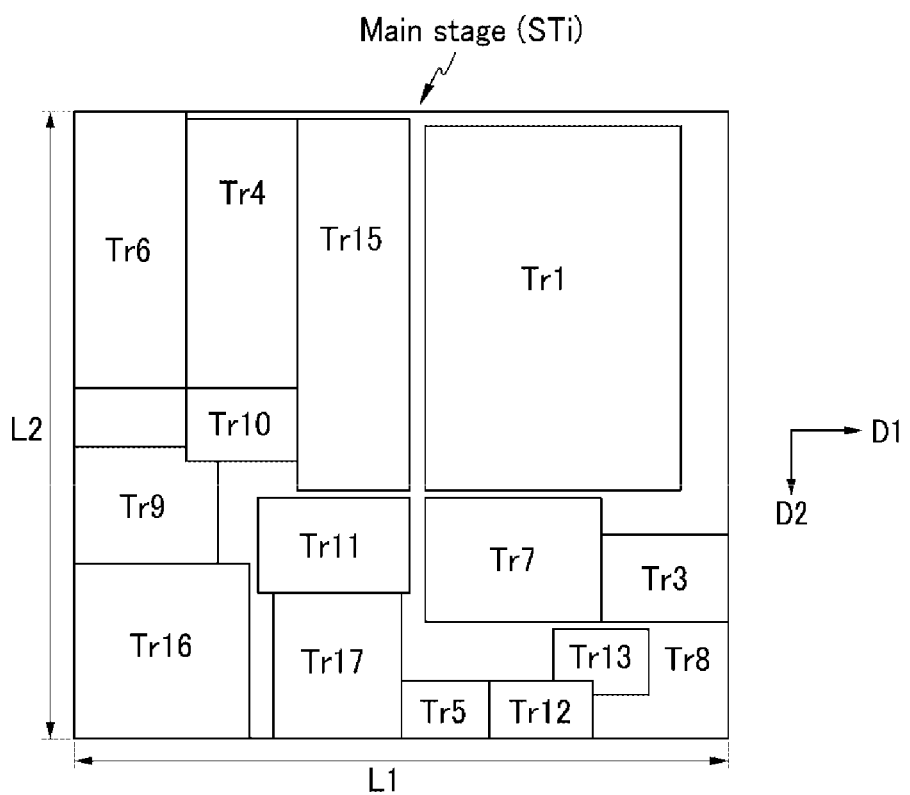

DISPLAY DEVICE

CROSS-REFERENCE TO RELATED APPLICATION

This application is a continuation application of U.S. patent application Ser. No. 13/725,684 filed on Dec. 21, 2012, which claims priority to Korean Patent Application No. 10-2012-0080794 filed in the Korean Intellectual Property Office on Jul. 24, 2012, and all the benefits accruing therefrom under 35 U.S.C. §119, the contents of the prior applications being herein incorporated by reference.

BACKGROUND (a) Field of Disclosure

The present disclosure of invention relates to a display device. In detail, the present invention relates to a display device including a gate lines driver having a novel configuration.

(b) Description of Related Technology

In general, a Liquid Crystal Display (LCD) or another such panel type display device includes a display area that is populated by a matrix of pixel units which are the unit cells used for displaying a desired image. Additionally, the display includes a set of driver circuits for addressing and driving the pixel units. The driver units typically include a data lines driver configured for applying respective data voltages to columns of the pixel units by way of respective data lines and a gate lines driver configured for applying respective gate signals to rows of the pixel units by way of respective gate lines where the combination row selection and data lines driving may be used for selectively controlling the transfer of the data voltages to desired ones of the pixel units. In one class of embodiments, one or both of the gate lines driver and the data lines driver are mounted on a printed circuit board (PCB) in the form of one or more monolithically integrated circuit chips that are connected a flexible interconnect film to the display panel and its on-panel pixel units. In a same or alternate class of embodiments, at least the gate lines driver is provided in the form of one or more monolithically integrated circuit chips that are mounted directly on the display panel. In yet another class of embodiments, at least the gate lines driver is provided in the form of monolithically integrated circuitry that is integrated directly in the display panel without use of discrete IC chips. In the case where at least the gate lines driver is provided in the form of monolithically integrated, on-panel circuitry, the gate lines driver circuitry consumes part of the area of the panel that also supports the display area (DA) and its unit pixel cells. Recently, market forces have begun calling for mobile devices (e.g., smartphones) horizontal display areas that extend substantially over the whole of the display panel while allowing for only a relatively small peripheral area positioned near and surrounding the display area. It has therefore become undesirable to have a panel with a peripheral area that is too large, and thus the class of embodiments having at least the gate lines driver provided in the form of monolithically integrated circuitry that is integrated directly in the peripheral area of the display panel has begun to fall out of favor.

Also, in another class of embodiments, for example large-area TV monitors and the like, there has been a trend for form the large area device by tiling together a plurality of smaller panels. There too, market forces favor a panel with a very small peripheral area positioned near and surrounding the display area and thus the class of embodiments having at least the gate lines driver provided in the form of monolithically integrated circuitry that is integrated directly in the peripheral area of the display panel has begun to fall out of favor.

In its details, the typical gate lines driver includes a shift register circuit constituted by a plurality of alike shift register stages which are connected in cascade manner and operate interdependently and in synchronism signals provided to them by a plurality of signal lines extending adjacent to the stages. In yet more detail, each of the stages is connected to drive a corresponding one gate line and the plurality of stages are interconnected so as to output their respective gate signals to the respective gate lines sequentially according to a predetermined order.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a layout design that helps reduce area consumed in a peripheral area of a display device for implementing the gate lines driver circuit.

More specifically, and in accordance with disclosure, a display panel is provided including a first edge extending in a first direction and a second edge substantially continuing from the first edge and extending in a second direction different from the first direction; a plurality of gate lines arranged in the first direction; and a gate lines driver including a plurality of stages sequentially connected to each other and outputting respective gate signals to the plurality of gate lines, wherein the plurality of stages include a plurality of main stages arranged in a column along the first edge and connected to the plurality of gate lines and one or more dummy stages extending in and arranged in a row along the second edge, wherein a first layout (arrangement) of thin film transistors (TFTs) used in each the main stages is different from a second layout (arrangement) of TFTs used in the one or more dummy stages.

A dummy loads pattern may be connected to the at least one dummy stage and neighboring the at least one dummy stage in the second direction.

At least one of the at least one dummy stage may include an output terminal outputting a dummy gate signal, and the dummy loads pattern may include one or more of electric load elements connected to the output terminal.

A first thin film transistor of the plurality of thin film transistors of the first main stage may include a plurality of first unit subtransistors, a second thin film transistor performing a same function as the first thin film transistor among the plurality of thin film transistors of the first dummy stage may include a plurality of second unit subtransistors, where the number of first unit subtransistors is different from that of the plurality of second unit subtransistors.

An elongation direction of a channel of one of the plurality of first unit transistors may be different from an elongation direction of a channel of one of the plurality of second unit subtransistors.

A direction of a channel width of one of the plurality of second unit transistors may be the second direction.

A length in the second direction of the first dummy stage may be longer than a length in the first direction and a length in the second direction of the first main stage.

A channel width of one of the plurality of first unit transistors may be different from a channel width of one of the plurality of second unit transistors.

A channel width of one of the plurality of first unit transistors may be less than a channel width of one of the plurality of second unit transistors.

A control signal line transmitting a control signal to the plurality of main stages and the at least one dummy stage may be further included, wherein the control signal line may include a first portion extending along the first edge, a second portion extending along the second edge, and a corner portion connecting the first portion and the second portion, and the corner portion may form an oblique angle with the first direction and the second direction.

The control signal line may include at least one of a clock signal line, a scanning start signal line, and a low voltage line.

The at least one dummy stage may be connected to at least one main stage among the plurality of main stages through corner wiring, and the corner wiring may form an oblique angle with the first direction and the second direction.

An alignment key positioned between the corner portion of the control signal line and the first edge or the second edge may be further included.

The display panel may include a display area displaying an image and a peripheral area around the display area, and at least a portion of the plurality of thin film transistors of the first main stage may be positioned in the display area.

The display panel may further include a third edge facing the first edge, and the plurality of stages of the gate lines driver may further include a plurality of main stages arranged in a row along the third edge and connected to the plurality of gate lines, and at least one dummy stage connected to the plurality of main stages arranged along the third edge.

A dummy loads pattern connected to an output terminal of the at least one dummy stage connected to the plurality of main stages arranged along the third edge may be further included.

The display panel may include a display area displaying an image and a peripheral area around the display area, and the gate lines driver may include a third portion positioned in the peripheral area and a fourth portion positioned in the display area.

The fourth portion may include at least one active element.

A length in the first direction of one dummy stage among the at least one dummy stage may be less than a length in the first direction of one main stage among the plurality of main stages.

An area of a dummy stage may be different from an area of a main stage.

The one or more dummy stage may include at least two dummy stages having different areas.

A length in the first direction of one dummy stage among the at least one dummy stage may be less than a length in the second direction of the one dummy stage.

According to an exemplary embodiment of the present disclosure, the peripheral area of the display device may be reduced by the layout configuration and disposition of the dummy stages.

BRIEF DESCRIPTION OF THE DRAWINGS

FIG. 4 shows side-by-side and relative layout views of first and second thin film transistors respectively included in a main stage and a dummy stage of a gate lines driver according to the exemplary embodiment, FIG. 8 is a top plan, layout view in schematic form showing side-by-side and relative layouts respectively of a main stage and a dummy stage of a gate lines driver device according to the present disclosure.

DETAILED DESCRIPTION

Figure 1:
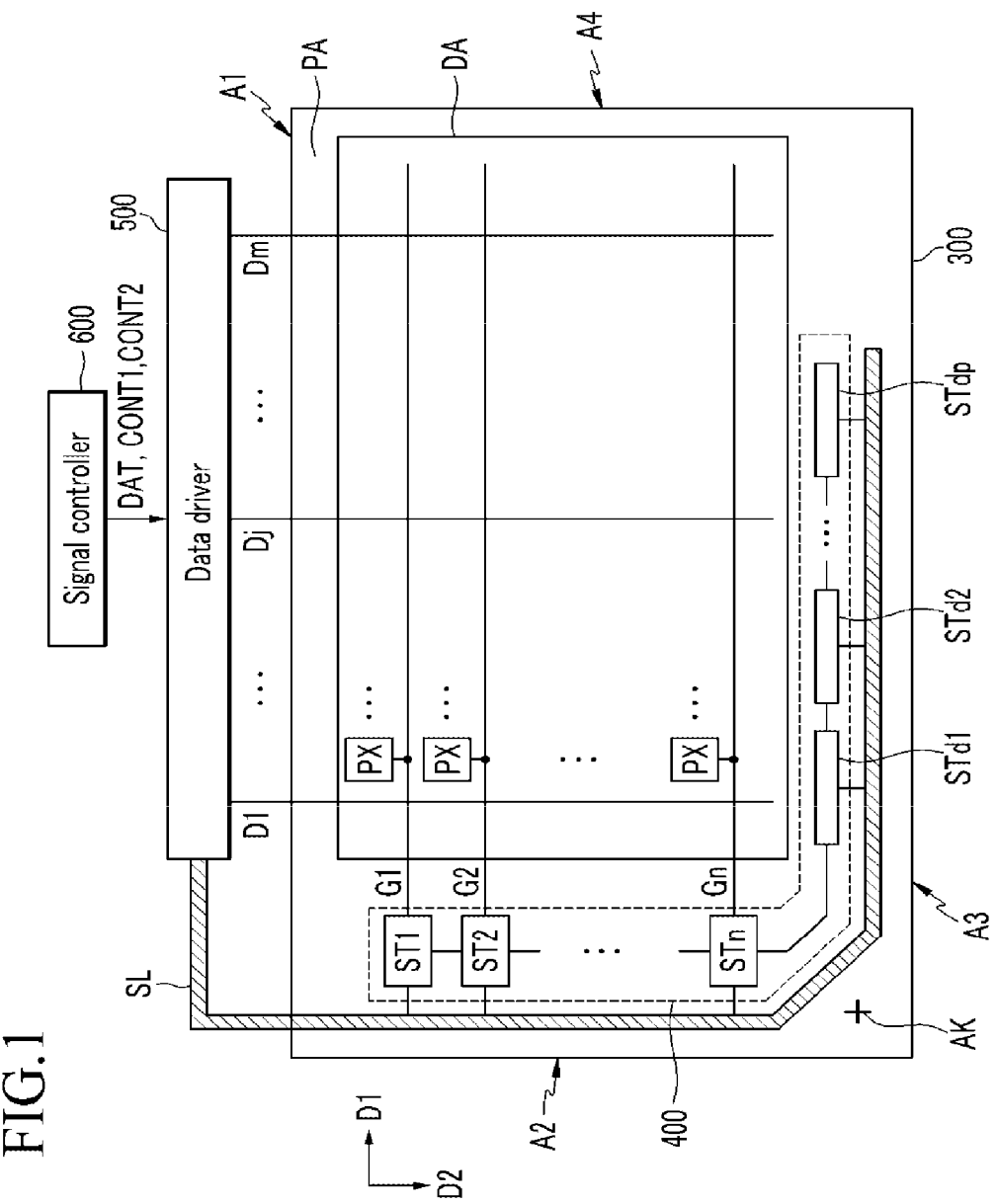
FIG. 1 is a block diagram including block-level layout of a display device according to an exemplary embodiment of the present disclosure of invention.

The present disclosure of invention will be described more fully hereinafter with reference to the accompanying drawings, in which exemplary embodiments of are shown. As those skilled in the art would realize in light of the present disclosure, the described embodiments may be modified in various different ways, all without departing from the spirit or scope of the present teachings.

In the drawings, the thickness of layers, films, panels, regions, etc., are generally exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a display device according to a first exemplary embodiment will be described with reference to FIG. 1, FIG. 2, FIG. 3A, FIG. 3B, FIG. 4, and FIG. 5.

Figure 2:
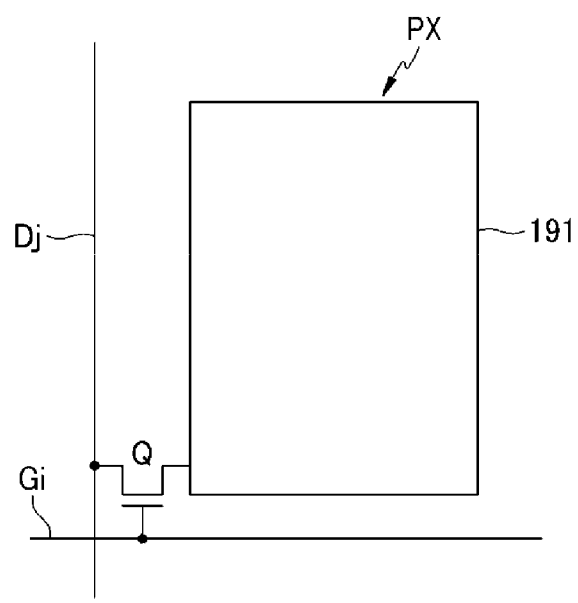
FIG. 2 is a schematic circuit diagram of one pixel unit of a display device according to the exemplary embodiment.
Figure 3A:
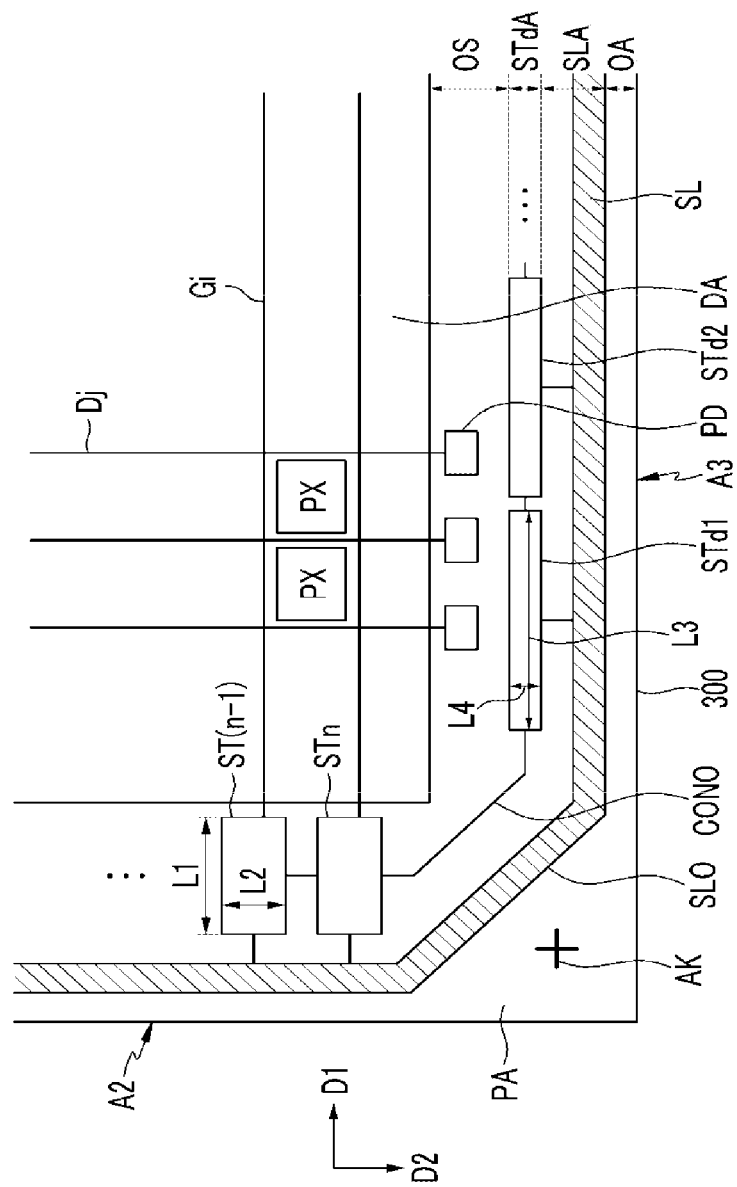
FIG. 3A and FIG. 3B are layout views partially showing a display panel included in a display device according to the exemplary embodiment.
Figure 3B:
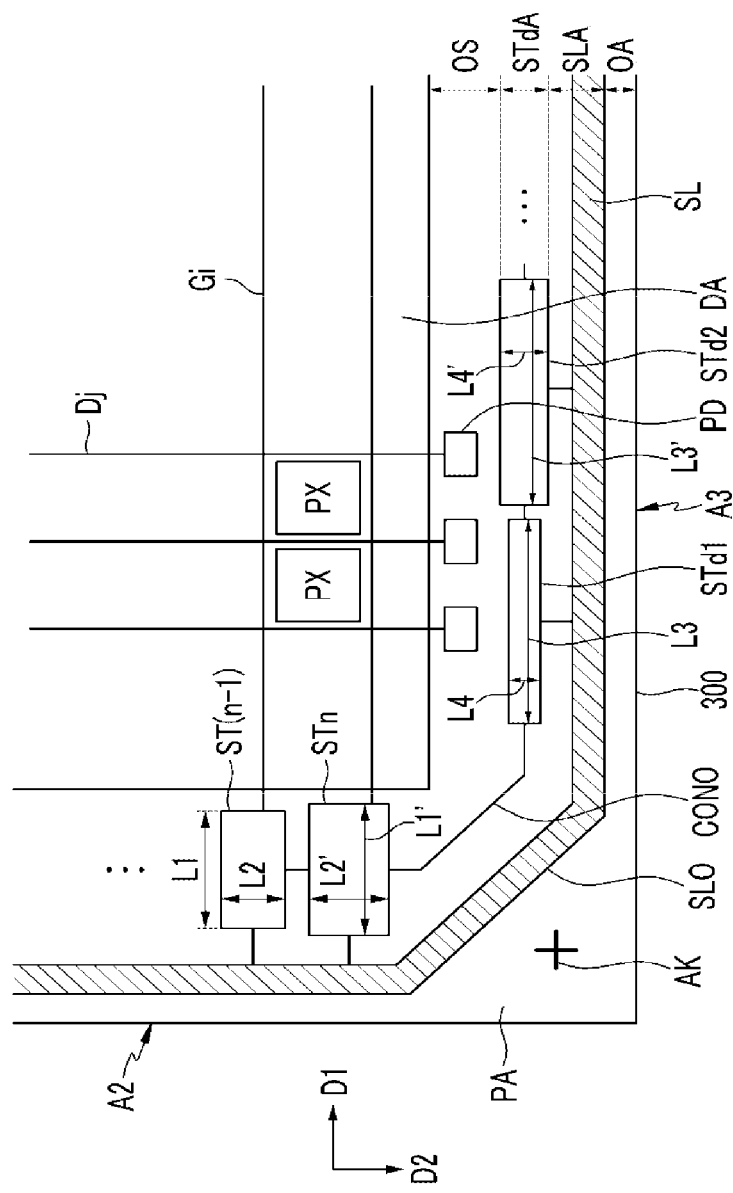
Figure 5:
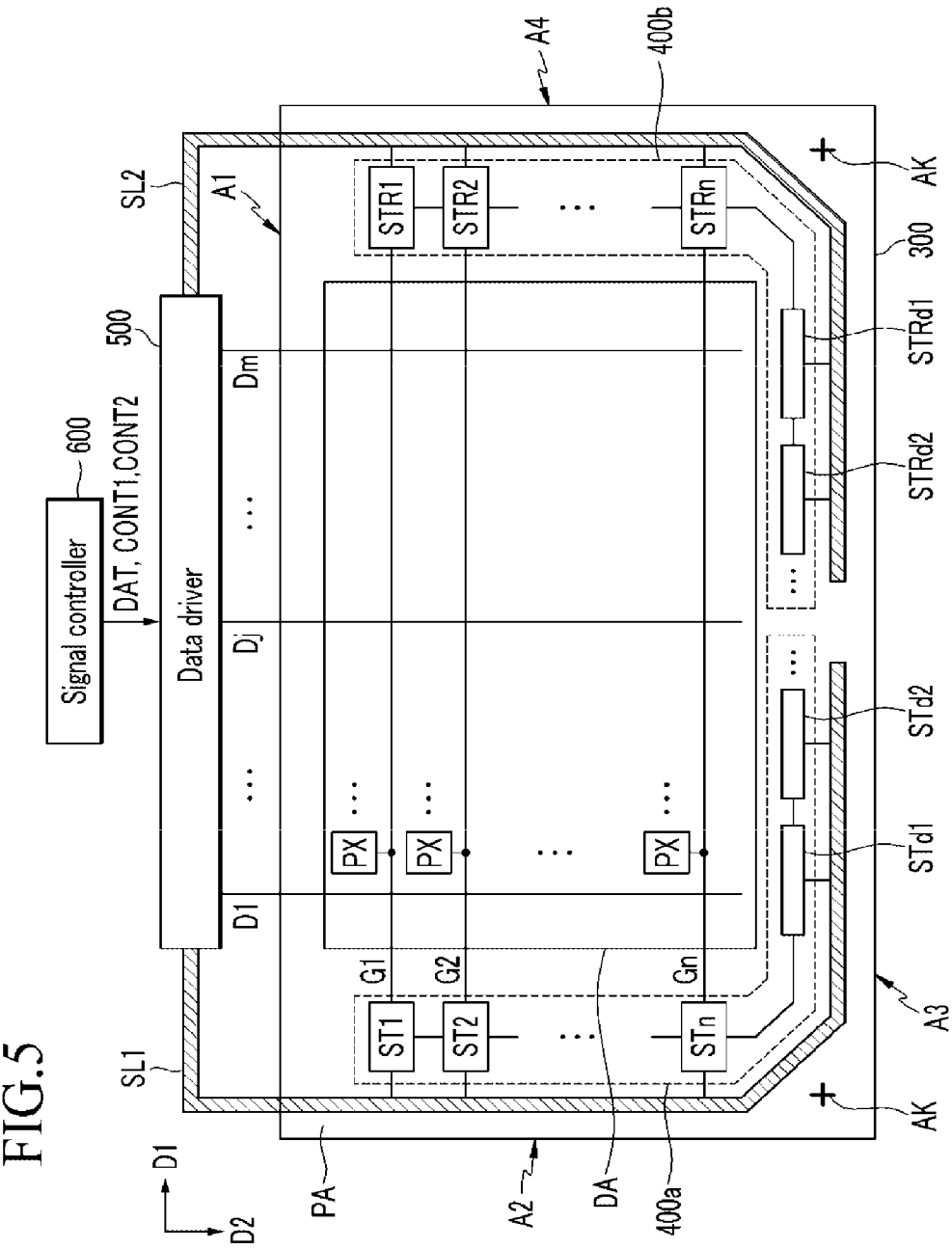
FIG. 5 is a block diagram of a display device according to a second exemplary embodiment.

FIG. 1 is a block diagram of a display device according to the first exemplary embodiment. FIG. 2 is a schematic circuit diagram of one pixel unit of a display device of FIG. 1. FIG. 3A and FIG. 3B are layout views partially showing a display panel included in the display device of FIG. 1. FIG. 4 shows side-by-side layout views of respective thin film transistors (TFTs) included in a main stage and a dummy stage of a gate lines driver according to an exemplary embodiment. FIG. 5 is a block diagram of a display device according to an exemplary embodiment.

Referring to FIG. 1, the display device according to the first exemplary embodiment includes a display panel 300, a gate lines driver 400, a data driver 500, and a signal controller 600.

The display panel 300 may be a monolithically integrated display panel such as is included in various flat panel displays (FPD), for example a liquid crystal display (LCD), an organic light emitting diode (OLED) display, and an electrowetting display (EWD).

The display panel 300 is subdivided into a display area DA having pixel units for displaying an image and a non-display or peripheral area PA as a remaining region thereof.

The display area DA includes a plurality of gate lines G1-Gn, a plurality of data lines D1-Dm, and a plurality of pixels PX operatively coupled to the plurality of gate lines G1-Gn and to the plurality of data lines D1-Dm.

The gate lines G1-Gn transfer respective gate signals to their respective pixel units PX. The gate lines substantially extend in a row direction (referred to as a first direction D1), and may be substantially parallel to each other. The data lines D1-Dm transfer respective data voltages corresponding to developed image signals to their respective pixel units PX. The data lines substantially extend in a column direction (referred to as the second direction D2), and may be substantially parallel to each other.

The plurality of pixels PX are arranged substantially as a matrix, for example one having rows and columns. Referring to FIG. 2, each pixel unit PX may include a switching element Q (e.g., thin film transistor) connected to a corresponding gate line Gi and a corresponding data line Dj, and a pixel electrode 191 also connected to the switching element Q. The switching element Q may be a three terminal element such as a thin film transistor (TFT) monolithically integrated in the display panel 300. The switching element Q is turned on or turned off according to a gate signal applied thereto by way of the corresponding gate line Gi. The switching element Q may selectively transmit the data signal from the data line Dj to the pixel electrode 191 when turned on. The switching element Q may include at least one thin film transistor. The pixel PX may display a corresponding pixel portion of the intended image according to the data voltage applied to the pixel electrode 191.

According to another exemplary embodiment, one pixel PX may include a plurality of subpixels providing respective light output control according, for example to different gamma curves, and at least one switching element. Areas of the different subpixels included in one pixel PX may be equal to each other or not.

According to another exemplary embodiment, the display area DA of the panel may be divided into a plurality of tiled sub-regions, and a portion of the non-display area may be disposed between neighboring sub-regions.

The non-display area of the display panel 300 includes a peripheral area PA positioned around the display area DA as shown in FIG. 1. The peripheral area PA may be covered by a light blocking member such as a bezel portion of the display housing. The peripheral area PA may enclose the display area DA or may be positioned at the edge of the display panel 300.

The side edges of the peripheral area PA, that is, the respective side edge areas (A1, A2, A3, and A4) of the display panel 300 include respective side edges of the panel. The respective side edge areas (A1, A2, A3, and A4) may be elongated so as to extend in different directions. For example, the neighboring edge areas (A1, A2, A3, and A4) may extend to be crossed relative to one another. In detail and as shown in FIG. 1, among the edge areas of the display panel 300, the edge area of a side where the data driver 500 is positioned is referred herein to as the first edge A1, the edge facing and parallel to the first edge A1 is referred to as the third edge A3, and two edges connecting the first and third edges A1 and A3 are referred to as the second edge A2 and the fourth edge A4.

The gate lines driver 400 and a bus having plurality of control signal lines SL are positioned in the peripheral area PA. The data lines driver 500 may be monolithically integrated in the peripheral area PA of the display panel 300, or it may be mounted in the peripheral area PA of the display panel 300 as a plurality of data lines driving chips. Also, the gate lines G1-Gn and the data lines D1-Dm of the display area DA may be positioned in the display area DA while also extending into the peripheral area PA.

The signal controller 600 controls the data lines driver 500 and the gate lines driver 400.

The signal controller 600 receives input image signals and input control signals for controlling the display thereof from an external graphics controller (not shown). The input control signal includes a vertical synchronization signal VSync, a horizontal synchronizing signal HSync, a main clock signal, and a data enable signal. The signal controller 600 appropriately processes the input image signal and then based on the input image signal and the input control signal, the signal controller 600 converts these so as to produce a corresponding digital image signal DAT and to generate a gate control signal CONT1 and a data control signal CONT2. The gate control signal CONT1 includes a scan start signal STV for instructing the start of scanning, and at least one clock signal for controlling an output period of the gate-on voltage Von, and at least one low voltage signal. The data control signal CONT2 includes a horizontal synchronization start signal for informing a start of transmission of the digital image signal DAT for one row of the pixels PX, a load signal, and a data clock signal.

The signal controller 600 may be mounted on a printed circuit board (PCB) separate from the panel 300 and may transmit the data control signal CONT2, the gate control signal CONT1, and the digital image signal DAT to the display panel 300 through an interconnect (not shown) such as a flexible printed circuit film.

The data driver 500 is electrically connected to the data lines D1-Dm of the display panel 300 and transmits the respective data voltages to the data lines D1-Dm. The data driver 500 receives the data control signal CONT2 and the digital image signal DAT from the signal controller 600, and for each pixel selects a gray voltage corresponding to the pixel's portion of the digital image signal DAT to thus convert the digital image signal DAT into an analog data signal. The data driver 500 outputs the generated analog signals to the corresponding data lines D1-Dm. The data driver 500 may include a plurality of data driving chips, or alternatively it may be monolithically integrated on the panel in the same process along with other thin film transistors of the display area DA of the display panel 300.

The gate lines driver 400 receives a control signal such as a gate control signal CONT1 from the data driver 500 through a plurality of control signal lines SL (also hereafter, bus SL) connected to the data driver 500 to generate a gate signal including a gate-on voltage ($V_{Gon}$) and a gate-off voltage ($V_{Goff}$) and to apply the gate signal to the gate lines G1-Gn. The gate-on voltage is a voltage turning on the thin film transistor, and the gate-off voltage is a voltage turning off the thin film transistor.

The plurality of control signal lines SL extend from the data lines driver of area A1 and then along the second direction D2 in side area A2 of the peripheral area PA in which a corresponding portion of the gate lines driver 400 is also positioned. In the illustrated example, the SL bus is bent (e.g., inclined) in a corner area where the second edge area A2 and the third edge area A3 of the display panel 300 meet, and it may extend along to the third edge area A3 as shown in FIG. 1.

The gate lines driver 400 includes a plurality of cascaded stages that are dependently connected one to the next and are sequentially arranged, where the plurality of stages include the plurality of main stages ST1-STn (n is a natural number) are respectively connected to the gate lines G1-Gn and there is at least one dummy stage STd1-STdp (p is a natural number) at the end of the cascade and disposed in the third edge area A3.

As seen, the plurality of main stages ST1-STn are disposed sequentially in the second direction D2 and along the second edge area A2 and are dependently connected to each other, and they generate the respective gate signals and they sequentially transmit the $V_{Gon}$ portions of the respective gate signals to the corresponding gate lines G1-Gn in sequence. Each of the main stages ST1-STn may have a respective gate signal output terminal (not shown) outputting its gate signals to its respective gate line.

Accordingly, the plurality of main stages ST1-STn are arranged as a column extending in the second direction D2 and along the left side of (as shown in FIG. 1 but it could alternatively or additionally be along the right side of) the display area DA. In other words, the plurality of main stages ST1-STn are arranged as one or more columns respectively extending in the second direction D2 and in one or both of the second edge area A2 and the fourth edge a A4 of the display panel 300 (see also briefly the embodiment of FIG. 5.). In FIG. 1, the plurality of main stages ST1-STn are positioned in the peripheral area PA of the side of the second edge A2 positioned at the left side of the display area DA, however it is not limited thereto, and they may be positioned in any position among the right, the left, and the lower edge of the peripheral area PA of the display area DA where, in accordance with the present disclosure and as shall be seen, the cascade includes one or more smaller sized dummy stages (STd).

According to an exemplary embodiment, each of the main stages ST1-STn may be connected to the output terminal of the previous stages ST1-STn or the next stages ST1-STn. The first main stage ST1 which is without a previous stage may be input with the scanning start signal STV informing it of the start of a scanning frame. The final main stage STn which is without a next main stage may be input with another signal instead of the connection to the output terminal of a next main stage.

Each of the main stages ST1-STn is connected to the low voltage $V_{Goff}$ corresponding to the gate-off voltage through at least one of the plurality of control signal lines SL. Also, each of main stages ST1-STn is connected to another low voltage (Vss2) that is lower than the gate-off voltage (Vss1) through at least one of the plurality of control signal lines SL.

Each of main stages ST1-STn receives at least one clock signal (CLK or CLKB) through at least one of the plurality of control signal lines SL. The driving clock signals may include a first clock signal CLK and an inverted second clock signal CLKB, where the odd numbered main stages ST1, ST3, . . . may be connected at a CK terminal thereof to the first clock signal CLK, and the even numbered main stage ST2, ST4, . . . may be connected at a CK terminal thereof to the second clock signal CLKB. The phase of the second clock signal CLKB may be opposite to the phase of the first clock signal CLK.

The dummy stages STd1-STdp are stages that are not connected to operative ones of the gate lines G1-Gn of the display area DA. Rather, the dummy stages STd1-STdp are disposed along a panel side edge adjacent to the edge along which the main stages ST1-STn are positioned. The dummy stages STd1-STdp may generate respective transmission signals including at least one that is input to at least one final main stage among the main stages ST1-STn that are connected to operative ones of the gate lines G1-Gn of the display area DA.

In terms of more detail, the dummy stages STd2-STdp may be positioned in the peripheral area PA and more specifically in the third edge area A3 of the display panel 300, which area is under the lower side of the display area DA. The dummy stages STd2-STdp may be arranged in a row extending in the first direction D1 and within the third edge area A3. The number of the dummy stages STd2-STdp may be one or more, and this number may be changed according to the driving method used by the gate lines driver 400 in combination with the gate control signal CONT1.

The dummy stage(s) STd1-STdp are connected to the output terminal of the portion of the main stages ST1-STn such as the final main stage STn or the previous dummy stages STd1-STdp and the next dummy stages STd1-STdp. The dummy stages STd1-STdp may receive the clock signal transmitted through the control signal bus SL like the main stages ST1-STn and the gate control signal CONT1 of the low voltage may be used to generate the dummy gate signal. The dummy stages STd1-STdp may include a dummy gate signal outputting terminal corresponding to the gate signal outputting terminal of each of the main stage ST1-STn, and may output the dummy gate signal through the dummy gate signal outputting terminal.

The main stages ST1-STn and the dummy stages STd1-STdp may include active elements such as a plurality of thin film transistors or diodes and passive elements such as capacitors monolithically integrated in the peripheral area PA of the display panel 300. The active elements and the passive elements included in the gate lines driver 400 may be formed in the same manufacturing process as the thin film transistor included in the pixel units PX of the display area DA.

The circuit schematics of the main stages ST1-STn and of the dummy stages STd1-STdp may be substantially the same. The sizes and/or shapes of the respective regions occupied by respective ones of the main stages ST1-STn may be uniform. Similarly, the sizes and/or shapes of the respective regions occupied by respective ones of the dummy stages STd2-STdp may be uniform. However, sizes and/or shapes and/or layouts of the dummy stages STd2-STdp need not be the same as those of the main stages ST1-STn.

More specifically and according to an exemplary embodiment of the present disclosure, the dummy stages STd2-STdp are not disposed in a column extending in the second direction D2 as a continuation of the column of main stages ST1-STn. Rather, the dummy stages STd2-STdp are disposed as a row in the peripheral area PA and extending along the first direction D1 and in the third edge area A3 whose terminal parts are adjacent to and connected to terminal parts of the second and the fourth edge areas, A2 and A4. The column(s) of main stages ST1-STn is/are positioned in at least one of the second and the fourth edge areas, A2 and A4.

At least one of the disposition of the dummy stages STd2-STdp in the third edge area A3 and the different sizes and/or shapes of the dummy stages STd2-STdp works to reduce the size of the peripheral area PA and thus the size of the display panel 300 as compared to designs where dummy stages are continued in the same column and/or are provided with same shapes and sizes as those of the main stages.

Referring to FIG. 3A and FIG. 3B, the peripheral area PA near the third edge area A3 of the display panel 300 may include a test pads region OS, a dummy stages region STdA, a signal wires region SLA, and a spacer region OA.

The test pads region OS is a region where the test pads PD are disposed and connected to respective ones of the data lines Dj of the display area DA. The test pads region OS is positioned such as to allow input of test signals to the data lines Dj through the test pads PD of the test pad region OS in the manufacturing process of the display panel 300. A width in the second direction D2 of the test pads region OS may be in a range about 0.3 mm to about 0.6 mm, but is not limited thereto. The test pads region OS may be omitted.

The dummy stages region STdA is region where a plurality of dummy stages STd1-STdp are positioned. The dummy stages region STdA may be disposed under the test pads region OS. The width in the second direction D2 of the dummy stage region STdA may be changed according to a width in the second direction D2 of the region occupied by the respective dummy stages STd1-STdp. The width in the second direction D2 of the dummy stage region STdA may be in a range about 0.4 mm to about 0.7 mm, but is not limited thereto.

The signal wires bus region SLA is a region where a plurality of control signal lines SL (the SL bus) are disposed and it may be positioned under the dummy stages region STdA. However, at least a portion of the control signal lines SL may be positioned on or as extending to the dummy stages region STdA for connection to the dummy stages. The width in the second direction D2 of the signal wires region SLA may be in a range from about 0.2 mm to about 0.4 mm, but is not limited thereto.

The spacer region OA is a region between the signal wires region SLA and the third edge A3 of the display panel 300. This spacer region OA does not include any signal wires or other electric elements. The width in the second direction D2 of the spacer region OA may be appropriately determined so as to reduce a degree of danger that the plurality of control signal lines SL are damaged by an external influence. For example, the width in the second direction D2 of the spacer region OA may be in a range from about 0.4 mm to about 0.7 mm.

Referring to FIG. 3A and FIG. 3B, at least one dummy stage STd1-STdp is connected through a corner wiring connection CONO to at least one main stage ST1-STn such as the final main stage STn so as to receive and output the various output signals used for propagating the gate line drive signals sequentially down the shift register chain. The corner wiring CONO is positioned in the peripheral area PA of the corner where the second edge area A2 or the fourth edge area A4 of the display panel 300 meets with the third edge area A3. The corner wiring CONO may form an oblique angle with the first direction D1 and with the second direction D2, and in detail, the angle may be larger than 0 degrees to less than 90 degrees with the first direction D1 with a nominal value therefor being about 45 degrees as shown.

Likewise, at least one control signal line among a plurality of control signal lines SL may include a corner portion SLO extending to form an oblique angle with the first direction D1 and the second direction D2 near the corner where the second edge A2 or the fourth edge A4 of the display panel 300 meets the third edge A3. The plurality of control signal lines SL beside the corner portion SLO include a portion substantially parallel to the first direction D1 or to the second direction D2.

According to the first exemplary embodiment, near the corner where the second edge A2 or the fourth edge A4 of the display panel 300 meets the third edge A3, the corner portion SLO and the corner wiring CONO of a plurality of control signal lines SL form an oblique angle with the first direction D1 such that an unoccupied space is left in the corner of the display panel 300. In the unoccupied space of the display panel 300, as shown in FIG. 1 and FIG. 3A or FIG. 3B, an alignment key AK may be formed. The alignment key AK may be a marking and/or other signaling means that is positioned to the outside of the corner portion SLO of the control signal lines SL, that is, between the corner portion SLO and at least one edge of the first to fourth edges A1, A2, A3, and A4. The alignment key AK may be used to align an element such as a signal wire and/or a polarizer sheet or plate or other such element to the substrate during the manufacture and/or use of the display panel 300.

According to an exemplary embodiment, a plurality of control signal lines SL may be positioned between the edge of the display panel 300 and the main stages ST1-STn or the dummy stages STd1-STdp. Alternatively, at least one among a plurality of control signal lines SL may be positioned between the main stages ST1-STn or the dummy stages STd1-STdp and the display area DA.

Referring to FIG. 3A and FIG. 3B, the respective region occupied by a respective one of the main stages ST1-STn is different from the respective region occupied by a respective one of the dummy stages STd1-STdp. The difference may include one or more of the direction of elongation of the region, the width and/or length and/or width-to-length ratio of the respective region and/or the layout of electrical components provided in the respective region. In other words, at least the size of the region occupied by one of the main stages ST1-STn may be different from the size of the region occupied by one of the dummy stages STd1-STdp.

When the length in the first direction D1 of one of the main stage ST1-STn is referred to as the first length L1, and the length in the second direction D2 is referred to as the second length L2, and additionally the length in the first direction D1 of one of the dummy stage STd1-STdp is referred to as the third length L3, and the length in the second direction D2 is referred to as the fourth length L4, a ratio of the first length L1 and the second length L2 (L1/L2) may be different from a ratio of the third length L3 and the fourth length L4 (L3/L4). The third length L3 of the dummy stage may be longer than each of the first length L1 and the second length L2 as well as being longer than the L4 width dimension of its respective dummy stage. (L3>L1, L3>L2, L3>L4).

According to another exemplary embodiment of the present disclosure, the areas or the sizes of two main stages ST1-STn among the plurality of main stages ST1-STn may be different. For example, as shown in FIG. 3B, the first length L1 in the first direction D1 of one main stage ST(n−1) may be different from the length L1' of the first direction D1 of another main stage STn, and the second length L2 in the second direction D2 of one main stage ST(n−1) may be different from the length L2' in the second direction D2 of another main stage STn.

Also, the areas or the sizes of two dummy stages STd1-STdp among the plurality of dummy stages STd1-STdp may be different. For example, as shown in FIG. 3B, the third length L3 in the first direction D1 of one dummy stage STd1 may be different from the length L3' of in first direction D1 of another dummy stage STd2, and the fourth length L4 in the second direction D2 of one dummy stage STd1 may be different from the length L4' in the second direction D2 of another dummy stage STd2. Alternatively, the areas or the sizes of the rest of the dummy stages STd1-STd(p−1) except for the final dummy stage STdp among the plurality of dummy stages STd1-STdp may be substantially the same, and the area or the size of the final dummy stage STdp may be different from the area and the size of the rest of the dummy stages STd1-STd(p−1).

In an exemplary embodiment, the dummy stages STd1-STdp are not disposed co-linearly (e.g., in a same column) with the main stage ST1-STn but rather they are disposed along the third edge A3 at the bottom of the display panel 300, and the form factor of the dummy stages STd1-STdp is elongated in the first direction, thereby elongating the third length L3. Accordingly, the fourth length L4 of the dummy stage STd1-STdp may be further reduced, and the fourth length L4 may be shorter than the first length L1. Accordingly, the area of the peripheral area PA at the side of the third edge A3 of the display panel 300 may be reduced due to the different form factor of the dummy stages.

As described, the size and the shape of the respective region occupied by each of the main stages ST1-STn is different from the size and the shape of the respective region occupied by each of the dummy stages STd1-STdp such that the arrangement (layout) of a plurality of thin film transistors included in the main stages ST1-STn is different from the arrangement of a plurality of thin film transistors included in the dummy stages STd1-STdp. Here, the arrangement includes an arrangement relation of a unit transistor included in each corresponding thin film transistor or the length in the channel width direction or the channel width as well as a mutual arrangement relation of a plurality of thin film transistors.

Also, among the arrangement of a plurality of thin film transistors included in each of the main stages ST1-STn and a plurality of thin film transistors included in each of the dummy stages STd1-STdp, the structures of the shape and the size of the thin film transistors corresponding to each other or the shape of the unit transistor may be different. Here, the thin film transistors corresponding to each other may be thin film transistors performing the substantially the same function bit not necessarily to the same degree of drive capability (because for example, the dummy stages do not need to drive actual gate lines).

FIG. 4 includes a part 4(a) side by side with a part 4(b) to show in side-by-side comparison manner an example of the shape of the thin film transistors Trf corresponding to each other in one main stage STi of the main stages ST1-STn and one dummy stage STdk of the dummy stages STd1-STdp. It is to be noted that the reference frame (D1/D2) of FIG. 4 part 4(b) is rotated 90 degrees relative to that of part 4(a) for the sake of conserving drawing real estate. In other words, a more realistic side-by-side comparison would show UL2 as rotated by 90 degrees.

One exemplary thin film transistor Trf of the main stage STi and one exemplary TFT of the dummy stage STdk includes a plurality of unit subtransistors Utr1, Utr2, . . . , Utr10, Utrd1, Utrd2, and Utrd3, and each of the unit subtransistors Utr1, Utr2, . . . , Utr10, Utrd1, Utrd2, and Utrd3 includes a respective one channel region. A plurality of unit subtransistors Utr1, Utr2, . . . , Utr10 are ganged in parallel to form a respective one thin film transistor Trf of the main stage STi where the latter may include one source electrode 173, one drain electrode 175, one gate electrode 124, and one semiconductor portion 154. Likewise, a plurality of unit subtransistors included in the thin film transistor Trf included in the dummy stage STdk may include one source electrode 173d, one drain electrode 175d, one gate electrode 124d, and one semiconductor portion 154d. The respective source electrodes, 173 and 173d and the drain electrodes, 175 and 175d of the main and dummy stage TFTs respectively may be formed as a plurality of branches adjacently disposed thereby forming a respective ganged plurality of unit subtransistors Utr1, Utr2, . . . , Utr10, Utrd1, Utrd2, and Utrd3.

According to an exemplary embodiment of the present invention, the number of unit subtransistors Utr1, Utr2, . . . , Utr10 included in one thin film transistor Trf of the main stage STi may be different from the number of unit subtransistors Utr1, Utr2, and Utr3 included in the corresponding thin film transistor Trf of the dummy stage STdk.

Also, each size of the unit subtransistors Utr1, Utr2, Utr10 included in one thin film transistor Trf of the main stage STi may be different from each size of the unit subtransistors Utr1, Utr2, and Utr3 included in the thin film transistor Trf of the dummy stage STdk.

In detail, the channel width direction D2 and the channel width UL1 of each of the unit subtransistors Utr1, Utr2, . . . , Utr10 included in one thin film transistor Trf of the main stage STi may be different from the channel width direction D1 and the channel width UL2 of each of the unit subtransistors Utr1, Utr2, and Utr3 of the dummy stage STdk. For example, the length UL2 in the channel width direction of each of the unit subtransistors Utr1, Utr2, and Utr3 of the dummy stage STdk may be longer than the length UL1 in the channel width direction of each of the unit subtransistors Utr1, Utr2, . . . , Utr10 of the main stage STi.

Here, the length UL1 in the channel width direction of the unit transistors Utr1, Utr2, . . . , Utr10 of the main stage STi may be a length in the first direction D2 shown in FIG. 3, and the length UL2 in the channel width direction of the unit transistors Utrd1, Utrd2, and Utrd3 of the dummy stage STdk may be a length in the first direction D1 shown in FIG. 3. Accordingly, instead of the length UL2 in the first direction D1 of the thin film transistor Trf included in the dummy stage STdk being longer than the length UL1 in the second direction D2 of the thin film transistor Trf included in the main stage STi, the length in the second direction D2 of the thin film transistor Trf of the dummy stage STdk may be shorter than the length in the first direction D1 of the thin film transistor Trf of the main stage STi such that the size of the peripheral area PA at the side of the third edge A3 of the display panel 300 may be further reduced.

The respective numbers given above for the unit subtransistors Utr1, Utr2, . . . , Utr10, Utrd1, Utrd2, and Utrd3 shown in FIG. 4 is not limited thereto.

Next, referring to FIG. 5, a display device according to another exemplary embodiment is substantially the same as most of the display device shown in FIG. 1 to FIG. 3, however in this further embodiment there are provided a first gate lines driver 400a and a separate second gate lines driver 400b which may be respectively disposed in the left and right left peripheral areas PA of the display panel 300. The first gate lines driver 400a is connected to a plurality of first control signal lines SL1 extending down along the left side. The first gate lines driver 400a is connected to receive control signals such as the gate control signal CONT1 from the signal controller 600. The second gate lines driver 400b is connected to a plurality of second control signal lines SL2 extending down along the right side. The second gate lines driver 400b is connected to also receive control signals such as the gate control signal CONT1.

The first gate lines driver 400a and the second gate lines driver 400b may have substantially the same internal structures and characteristics as the gate lines driver 400 of the first embodiment. The first gate lines driver 400a includes a plurality of left main stages ST1-STn arranged in a first column extending along the second direction D2 in the left region of the display panel 300 and at least one dummy stage STd1-STdp arranged in a row extending along the first direction D1. The second gate lines driver 400b includes a plurality of right main stages STR1-STRn arranged in a column extending along the second direction D2 in the right region of the display panel 300 and at least one dummy stage STRd1-STRdp arranged as a row extending along the first direction D1. The corresponding main stage of the first gate lines driver 400a and the second gate lines driver 400b may be connected, in one embodiment, to the same gate lines G1-Gn thereby applying the gate signal from opposite ends of the respective gate line. As described above, if the gate signal is applied to the gate lines G1-Gn at both sides of the display panel 300, a display defect due to a delay of the gate signal may be prevented although the size of the display panel 300 is increased.

According to another exemplary embodiment, as substantially shown in FIG. 5, the main stages ST1-STn of the first gate lines driver 400a may be connected to the odd numbered gate lines G1, G3, . . . , and the main stages STR1-STRn of the second gate lines driver 400b may be connected to the even numbered gate lines G2, G4, . . . , or an opposite connection relation may instead be used.

Also, the various characteristics and effects of the exemplary embodiment shown in FIG. 1 to FIG. 4 may be equally applied to the exemplary embodiment shown in FIG. 5. For example, the plurality of first and second control signal lines SL1 and SL2 may have the same characteristics as the plurality of control signal lines SL. Also, the alignment key AK may be formed near the corner of the right lower end of the display panel 300 as well as the corner of the left lower end of the display panel 300.

Next, an example of a detailed structure of the gate lines driver shown in FIG. 1 to FIG. 5 will be described with reference to FIG. 6.

Figure 6:
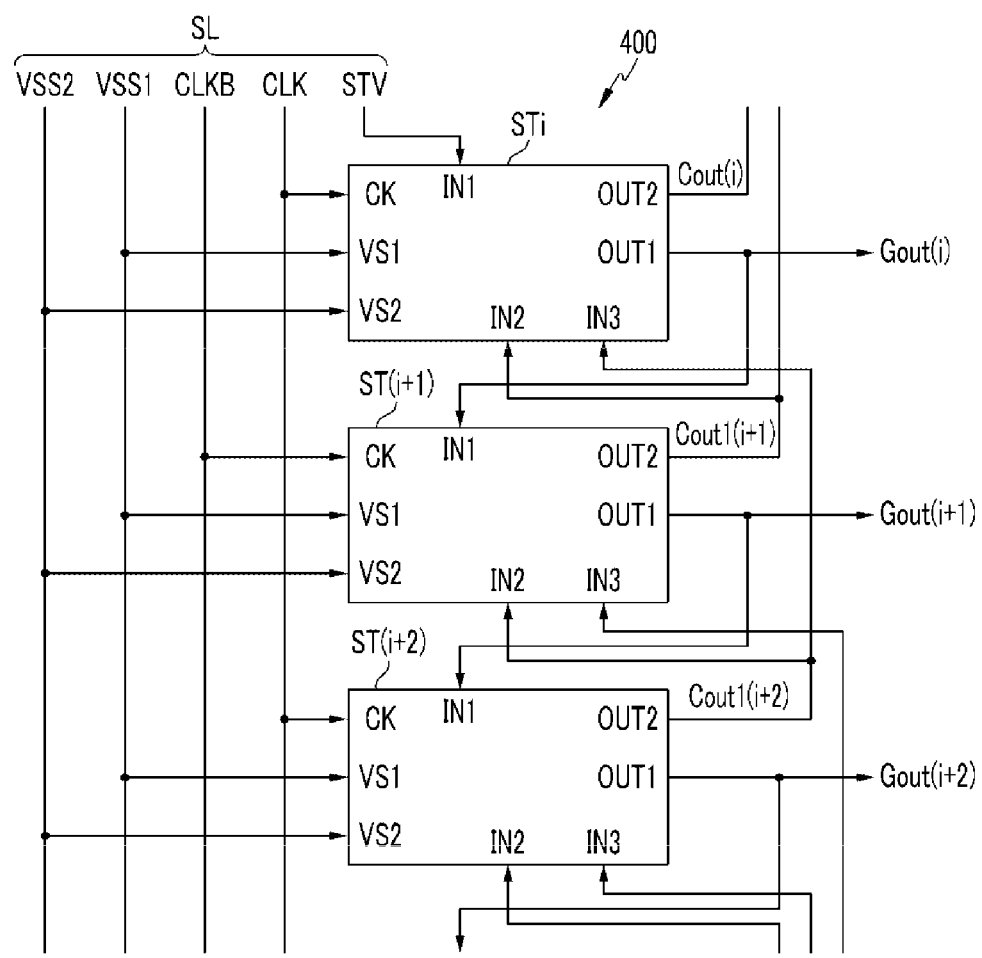
FIG. 6 is a block-level circuit diagram of a gate lines driver device according to an exemplary embodiment.

FIG. 6 is a block diagram of a gate lines driver according to an exemplary embodiment.

Referring to FIG. 6, any one of the gate lines drivers 400, 400a, and 400b according to its respective exemplary embodiment includes a plurality of stages ST1, . . . , STi, ST(i+1), ST(i+2), . . . , dependently connected to each other and sequentially outputting gate signals Gout1, . . . , Gout(i), Gout(i+1), Gout(i+2), . . . , Gout(n) and a plurality of control signal lines SL transmitting various control signals CLK, CLKB, VSS1, VSS2, and STV input to the stages ST1, . . . , STi, ST(i+1), ST(i+2), . . . The schematically represented plurality of stages ST1, . . . , STi, ST(i+1), ST(i+2), . . . of FIG. 6 include the described dummy stages STd1-STdp and STRd1-STRdp.

Hereafter, the control signal lines are indicated by the same signs as the signals CLK, CLKB, VSS1, V552, and STV that are transmitted by the corresponding control signal lines.

For example, a plurality of control signal lines SL may include the first clock signal line CLK transmitting the first clock signal CLK, the second clock signal line CLKB transmitting the second clock signal CLKB as the clock signal that is different from the first clock signal CLK, the first and second low voltage lines VSS1 and VSS2 respectively transmitting the first low voltage VSS1 and the second low voltage V552, and a scanning start signal line STV transmitting the scanning start signal STV.

The stage ST1, . . . , STi, ST(i+1), ST(i+2), . . . , each has a clock input terminal CK, a first low voltage input terminal VS1, a second low voltage input terminal VS2, a first output terminal OUT1, a second output terminal OUT2, a first signal input terminal IN1, a second signal input terminal IN2, and a third signal input terminal IN3.

The clock terminal CK of each of the stages ST1, . . . , STi, ST(i+1), ST(i+2), . . . , may be input with one of the first clock signal CLK and the second clock signal CLKB. For example, the clock terminal CK of the odd numbered stage ST1, ST3, . . . may be applied with the first clock signal CLK, and the clock terminal CK of the even numbered stages ST2, ST4, . . . may be applied with the second clock signal CLKB.

The first low voltage input terminal VS1 and the second low voltage input terminal VS2 may be input with the first low voltage VSS1 and the second low voltage VSS2 as respective low voltages having different magnitudes. According to an exemplary embodiment, the second low voltage VSS2 may be lower than the first low voltage VSS1. A value of the first low voltage VSS1 and the second low voltage VSS2 may be changed if necessary, and are lower than about −5 V.

The first output terminal OUT1 outputs the gate signals Gout1, . . . , Gout(i), Gout(i+1), Gout(i+2), . . . generated by the stages ST1, . . . , STi, ST(i+1), ST(i+2), . . . , and the second output terminal OUT2 outputs the transmission signals Cout1, . . . , Cout(i), Cout(i+1), Cout(i+2), . . . generated by the stages ST1, . . . , STi, ST(i+1), ST(i+2), The first signal input terminal IN1 may be input with the gate signal Gout1, . . . , Gout(i), Gout(i+1), Gout(i+2), . . . of the previous stage. In the case of the first main stage ST1 without the previous stage, the first signal input terminal IN1 may be input with the scanning start signal STV.

The second signal input terminal IN2 may be input with a transmission signal Cout1, . . . , Cout(i), Cout(i+1), Cout(i+2), . . . of the next stage, particularly the transmission signal Cout1, . . . , Cout(i), Cout(i+1), Cout(i+2), . . . of the immediate next stage.

The third signal input terminal IN3 may be input with the transmission signal Cout1, . . . , Cout(i), Cout(i+1), Cout(i+2), . . . of the next stage, particularly the transmission signal Cout1, . . . , Cout(i), Cout(i+1), Cout(i+2), . . . of the second next stage.

When the (i+2)th stage, ST(i+2) shown in FIG. 6 is the final main stage STn of the main stages ST1-STn according to an exemplary embodiment of the present disclosure, an (i+3)th stage serving as the first dummy stage STd1 generating the transmission signal to be input to the second signal input terminal IN2 of the final main stage ST(i+2) and the third signal input terminal IN3 of the previous stage ST(i+1) is required. Also, in the present exemplary embodiment, an (i+4)th stage serving as the second dummy stage STd2 to generate the transmission signal to be input to the third signal input terminal IN3 of the final stage ST(i+2) is further required.

Next, a detailed structure of each stage of the gate lines driver shown in FIG. 6 will be described with reference to FIG. 7.

Figure 7:
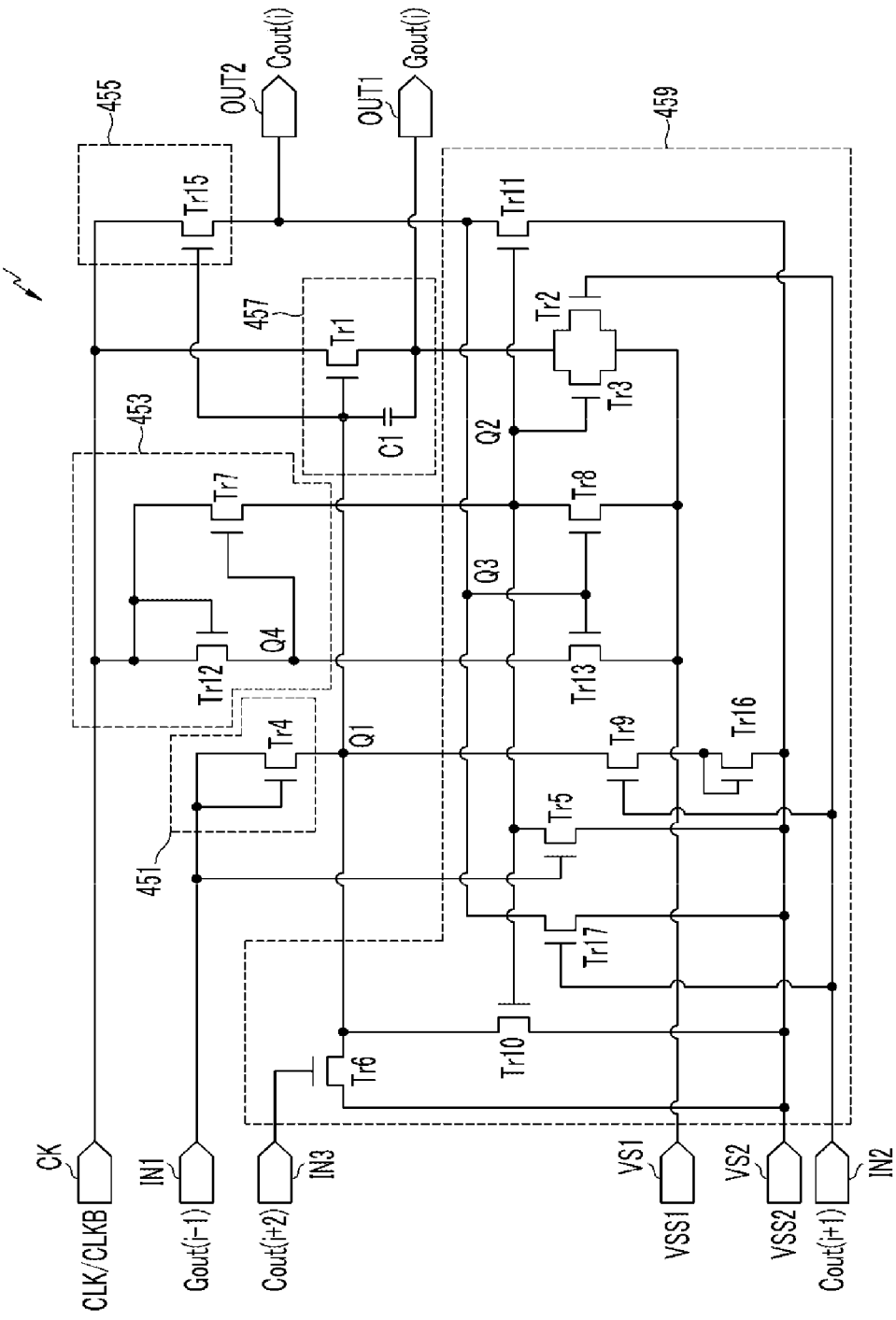
FIG. 7 is a more detailed circuit diagram of one stage of a gate lines driver device according to the present disclosure.

FIG. 7 is a schematic circuit diagram of a stage of a gate lines driver according to an exemplary embodiment of the present disclosure.

One stage of the gate lines driver according to an exemplary embodiment of the present invention is represented by the i-th stage STi as one of the main stages ST1-STn. The dummy stages STd1-STdp may also have the same schematic structure as the structure of the main stage STi according to the present exemplary embodiment although the layout may be different.

The stage STi according to an exemplary embodiment of the present invention includes a plurality of thin film transistors Tr1, . . . , Tr13, Tr15, Tr16, and Tr17 along with the clock terminal CK, the first low voltage input terminal VS1, the second low voltage input terminal VS2, the first output terminal OUT1, the second output terminal OUT2, the first signal input terminal IN1, the second signal input terminal IN2, and the third signal input terminal IN3.

The thin film transistors Tr1-Tr17 may be identified as alone or in groups defining an input unit 451 (denoted by a dashed block), an inverter unit 453 (also denoted by a respective dashed block as are the remaining units), a transmission signal unit 455, a pull-up unit 457, and a pull-down unit 459 according to a function thereof.

The input unit 451 is connected to the first signal input terminal IN1 to receive the gate signal Gout(i−1) of the previous stage (however, in the case of the first main stage, it is the scanning start signal STV). If the gate signal Gout(i−1) of the previous stage is the gate-on voltage, the input terminal and the output terminal are connected to each other such that the gate-on voltage is output as it is, while if the gate signal Gout(i−1) of the previous stage is the gate-off voltage, the input terminal and the output terminal are separated. According to an exemplary embodiment of the present invention, the input unit 451 includes the fourth thin film transistor Tr4. The input terminal and the control terminal of the fourth thin film transistor Tr4 are commonly connected to the first signal input terminal IN1 (a diode connection) and the output terminal is connected to the node Q1.

The inverter unit 453 is connected to the clock terminal CK and the nodes Q2 and Q4, and outputs a signal having an opposite phase to the gate signal Gout(i). In other words, the phase of the signal in the node Q2 connected to the output of the inverter unit 453 is opposite to the phase of the signal in the node Q3 connected to the first output terminal OUT1. Accordingly, the output signal of the inverter unit 453 or the signal of the node Q2 are referred to as an inverter signal. According to an exemplary embodiment of the present invention, the inverter unit 453 may include a seventh thin film transistor Tr7 and a twelfth thin film transistor Tr12. The control terminal and the input terminal of the twelfth thin film transistor Tr12 are commonly connected to the clock terminal CK, and the output terminal is connected to the node Q4. The control terminal of the seventh thin film transistor Tr7 is connected to the node Q4, the input terminal is connected to the clock terminal CK, and the output terminal is connected to the node Q2. A parasitic capacitor (not shown) may be formed between the input terminal and the control terminal of the seventh thin film transistor Tr7 and between the control terminal and the output terminal. If the clock signal CLK/CLKB from the clock terminal CK is a high signal, the twelfth thin film transistor Tr12 is turned on and the seventh thin film transistor Tr7 is turned on, and thereby the voltage of the node Q2 becomes the high signal. If the clock signal CLK/CLKB from the clock terminal CK is a low signal, the twelfth thin film transistor Tr12 is turned off, and the operation of the seventh thin film transistor Tr7 is changed according to the voltage of the node Q4. If the voltage of the node Q4 is the high signal, the seventh thin film transistor Tr7 is turned on such that the low voltage is transmitted to the node Q2, while if the voltage of the node Q4 is the low signal, the seventh thin film transistor Tr7 is turned off.

The transmission signal unit 455 is connected to the clock terminal CK, the node Q1, and the second output terminal OUT2, and outputs the transmission signal Cout(i) through the second output terminal OUT2. According to one exemplary embodiment, the transmission signal unit 455 may include a fifteenth thin film transistor Tr15. The clock terminal CK is connected to the input terminal of the fifteenth thin film transistor Tr15, the control terminal is connected to the node Q1, and the output terminal is connected to the second output terminal OUT2 and the node Q3. If the voltage of the node Q1 is the high signal, the clock signal CLK/CLKB from the clock terminal CK is output to the second output terminal OUT2, while if the voltage of the node Q1 is the low signal, the voltage of the node Q3 is output to the second output terminal OUT2. A parasitic capacitor (not shown) may be formed between the control terminal and the output terminal of the fifteenth thin film transistor Tr15.

The pull-up unit 457 is connected to the clock terminal CK, the node Q1, and the first output terminal OUT1, and outputs the gate signal Gout(i) through the first output terminal OUT1. According to one exemplary embodiment, the pull-up unit 457 includes the first thin film transistor Tr1 and the capacitor C1. The control terminal of the first thin film transistor Tr1 is connected to the node Q1, the input terminal is connected to the clock terminal CK, and the output terminal is connected to the first output terminal OUT1. The capacitor C1 is connected between the control terminal and the output terminal of the first thin film transistor Tr1. If the voltage of the node Q1 is the high signal, the clock signal CLK/CLKB from the clock terminal CK is output to the first output terminal OUT1. If the voltage of the node Q1 is decreased to the low signal, the first thin film transistor Tr1 is turned off and the low voltage input from the other terminal is output to the first output terminal OUT1.

The pull-down unit 459 decreases the potential of the nodes Q1 and Q2, the transmission signal Cout(i), or the gate signal Gout(i) such that the gate signal Gout(i) and the transmission signal Cout(i) may be stably output. The pull-down unit 459 includes a second thin film transistor Tr2, a third thin film transistor Tr3, a fifth thin film transistor Try, a sixth thin film transistor Tr6, an eighth thin film transistor Tr8 to an eleventh thin film transistor Tr11, a thirteenth thin film transistor Tr13, a sixteenth thin film transistor Tr16, and a seventeenth thin film transistor Tr17.

A circuit pulling down the node Q1 will be described. The sixth thin film transistor Tr6, the ninth thin film transistor Tr9, the tenth thin film transistor Tr10, and the sixteenth thin film transistor Tr16 pull down the node Q1.

The sixth thin film transistor Tr6 is turned on according to the transmission signal Cout(i+2) of the second next stage such that the voltage of the node Q1 is decreased to the second low voltage VSS2. The control terminal of the sixth thin film transistor Tr6 is connected to the third signal input terminal IN3, the output terminal is connected to the second low voltage input terminal VS2, and the input terminal is connected to the node Q1. In a case of the final main stage STn, to transmit the transmission signal Cout(i+2) of the second next stage through the third signal input terminal IN3, at least the two dummy stage STd1-SPdp are further required.

The ninth thin film transistor Tr9 and the sixteenth thin film transistor Tr16 are turned on according to the transmission signal Cout(i+1) of the next stage such that the node Q1 is pulled down, and for example, it is decreased to the second low voltage VSS2. The control terminal of the ninth thin film transistor Tr9 is connected to the second signal input terminal IN2, the first input/output terminal is connected to the node Q1, and the second input/output terminal is connected to the sixteenth thin film transistor Tr16. The control terminal and the output terminal of the sixteenth thin film transistor Tr16 are commonly connected to the second input/output terminal of the ninth thin film transistor Tr9 (the diode connection), and the input terminal is connected to the second low voltage input terminal VS2.

When the signal of the node Q2 is the high signal, the tenth thin film transistor Tr10 decreases the voltage of the node Q1 to the second low voltage VSS2. The control terminal of the tenth thin film transistor Tr10 is connected to the node Q2, the input terminal is connected to the second low voltage input terminal VS2, and the output terminal is connected to the node Q1.

Next, a circuit pulling down the node Q2 is described. The thin film transistor pulling down the node Q2 includes the fifth thin film transistor Tr5, the eighth thin film transistor Tr8, and the thirteenth thin film transistor Tr13.

The fifth thin film transistor Tr5 decreases the voltage of the node Q2 to the second low voltage VSS2 according to the gate signal Gout(i−1) of the previous stage. The control terminal of the fifth thin film transistor Tr5 is connected to the first signal input terminal IN1, the input terminal is connected to the second low voltage input terminal VS2, and the output terminal is connected to the node Q2.

The eighth thin film transistor Tr8 and the thirteenth thin film transistor Tr13 decrease the voltage of the node Q2 to the first low voltage VSS1 according to the voltage of the node Q3 or the transmission signal Cout(i). The control terminal of the eighth thin film transistor Tr8 is connected to the second output terminal OUT2 or the node Q3, the input terminal is connected to the first low voltage input terminal VS1, and the output terminal is connected to the node Q2. The control terminal of the thirteenth thin film transistor Tr13 is connected to the second output terminal OUT2 or the node Q3, the input terminal is connected to the first low voltage input terminal VS1, and the output terminal is connected to the node Q4. The thirteenth thin film transistor Tr13 decreases the potential of the node Q4 to the first low voltage VSS1 according to the voltage of the node Q3 or the transmission signal Cout(i) such that the seventh thin film transistor Tr7 is turned off. Accordingly, the clock signal CLK/CLKB input to the node Q2 is blocked such that the voltage of the node Q2 maintains the first low voltage VSS1 flowing through the eighth thin film transistor Tr8.

Next, a circuit decreasing the voltage of the transmission signal Cout(i)is described. The thin film transistor decreasing the voltage of the transmission signal Cout(i) includes the eleventh thin film transistor Tr11 and the seventeenth thin film transistor Tr17.

When the voltage of the node Q2 is the high signal, the eleventh thin film transistor Tr11 decreases the voltage of the transmission signal Cout(i) into the second low voltage VSS2. The control terminal of the eleventh thin film transistor Tr11 is connected to the node Q2, the input terminal is connected to the second low voltage input terminal VS2, and the output terminal is connected to the second output terminal OUT2.

The seventeenth thin film transistor Tr17 decreases the voltage of the second output terminal OUT2 to the second low voltage VSS2 according to the transmission signal Cout(i+1) of the next stage. The seventeenth thin film transistor Tr17 assists the operation of the eleventh thin film transistor Tr11. The control terminal of the seventeenth thin film transistor Tr17 is connected to the second signal input terminal IN2, the input terminal is connected to the second low voltage input terminal VS2, and the output terminal is connected to the second output terminal OUT2.

Next, a circuit stabilizing the voltage of the gate signal Gout(i) is described. The thin film transistor decreasing the voltage of the gate signal Gout(i) includes the second thin film transistor Tr2 and the third thin film transistor Tr3.

The second thin film transistor Tr2 changes the gate signal Gout(i) into the first low voltage VSS1 according to the transmission signal Cout(i+1) of the next stage. The control terminal of the second thin film transistor Tr2 is connected to the second signal input terminal IN2, the input terminal is connected to the first low voltage input terminal VS1, and the output terminal is connected to the first output terminal OUT1. According to another exemplary embodiment of the present invention, the input terminal of the second thin film transistor Tr2 may be connected to the second low voltage input terminal VS2.

When the voltage of the node Q2 is the high, the third thin film transistor Tr3 changes the gate signal Gout(i) of the current stage into the first low voltage VSS1. The control terminal of the third thin film transistor Tr3 is connected to the node Q2, the input terminal is connected to the first low voltage input terminal VS1, and the output terminal is connected to the first output terminal OUT1.

Next, layouts for a main stage and a dummy stage of the gate lines driver of the display device according to exemplary embodiments of the present disclosure will be described with reference to FIG. 8.

FIG. 8 is a top plan view of a schematic structure of a main stage and a dummy stage of the gate lines driver shown side-by-side for relative comparison according to an exemplary embodiment.

Referring to FIG. 8, one main stage STi among a plurality of main stages ST1-STn and one dummy stage STdk among at least one dummy stage STd1-STdp according to an exemplary embodiment may have the same schematic circuit structure, however the arrangement (layout) of the several thin film transistors included therein may be different. For example, in portion (a) of FIG. 8 is a schematic layout of the dummy stage STdk having the structure of the stage according to the exemplary embodiment shown in FIG. 7. Also, in portion (b) of FIG. 8 is a schematic layout of the main stage STi having the structure of the stage according to the exemplary embodiment shown in FIG. 7. In portion FIG. 8(a), for example, the arrangement of the thin film transistors Tr1, Tr3-Tr13, and Tr17 are partially shown, and in portion FIG. 8(b) there is partially shown the arrangement (layout) of the thin film transistors Tr1, Tr3-Tr13, Tr16, and Tr17.

As described above, each shape or size of the main stages ST1-STn connected to the gate line Gi is different from the shape or the size of dummy stages STd1-STdp, and accordingly, as shown in FIG. 8, the arrangements of the plurality of thin film transistors Tr1-Tr17 included in the dummy stage STdk and the main stage STi may be different.

The third length L3 in the first direction D1 of one dummy stage STdk according to an exemplary embodiment of the present invention is longer than the first length L1 in the first direction D1 of one main stage STi. The fourth length L4 in the second direction D2 of one dummy stage STdk may be shorter than the second length L2 in the second direction D2 of one main stage STi. Also, the area of one main stage STi may be different from the area of one dummy stage STdk.

Next, a display device according to another exemplary embodiment of the present disclosure will be described with reference to FIG. 9.

Figure 9:
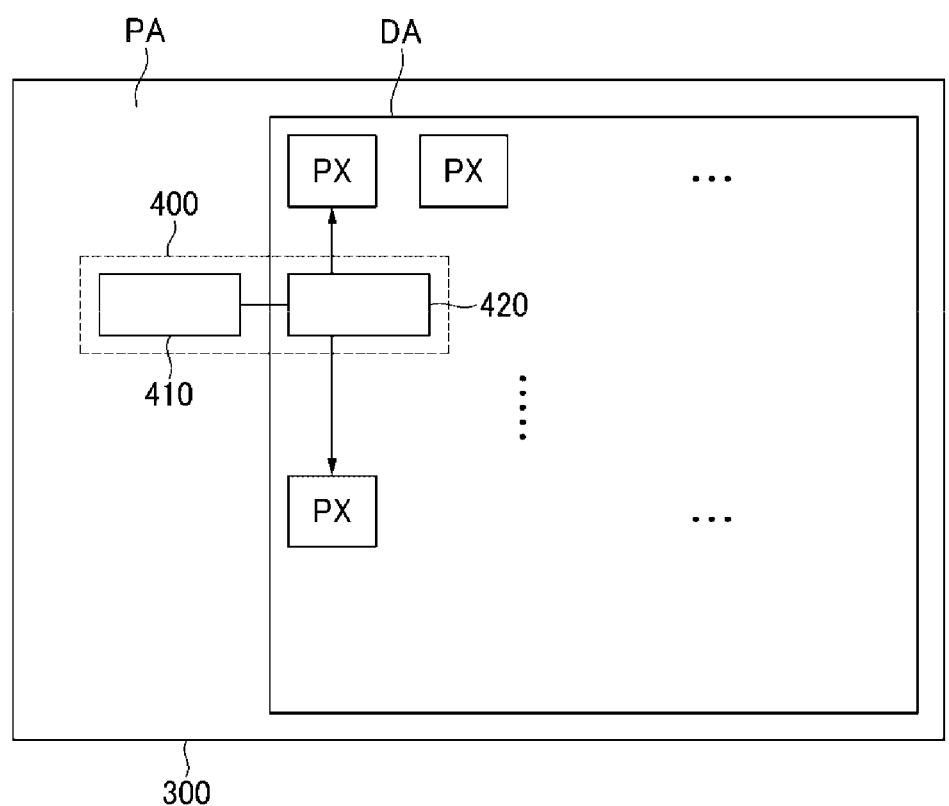
FIG. 9 is a schematic block diagram of a display panel according to another exemplary embodiment.

FIG. 9 is a block diagram of a display panel according to an exemplary third embodiment.

Referring to FIG. 9, the display panel 300 of the display device according to an exemplary embodiment is substantially the same as the several exemplary embodiments described above except for the gate lines driver 400 being subdivided into a first portion 410 positioned in the peripheral area PA and a second portion 420 which is positioned inside the display area DA. The first portion 410 and the second portion 420 are electrically connected to each other, and at least one of the first portion 410 and the second portion 420 may be electrically connected to a respective one or more pixels PX. The second portion 420 may be disposed as a thin row interposed between two adjacent rows of pixels PX.

According to an exemplary embodiment of the present invention, the first portion 410 and the second portion 420 may include at least one active element. According to another exemplary embodiment of the present invention, one active element may be divided and included in the first portion 410 and the second portion 420. In other words, the portion of one active element included in the gate lines driver 400 may be positioned in the display area DA and the remaining portion may be positioned in the peripheral area PA. According to another exemplary embodiment of the present disclosure, the second portion 420 may include at least one passive element, for example, a capacitor.

In FIG. 9, the first portion 410 of the gate lines driver 400 is denoted as being positioned at the left side of the display area DA, however it is not limited thereto. For example, the first portion 410 may be positioned at one side among the right, upper, and lower sides of the display area DA. The first portion 410 may be positioned at two or more positions of the up/down and right/left sides of the display area DA.

Figure 10:
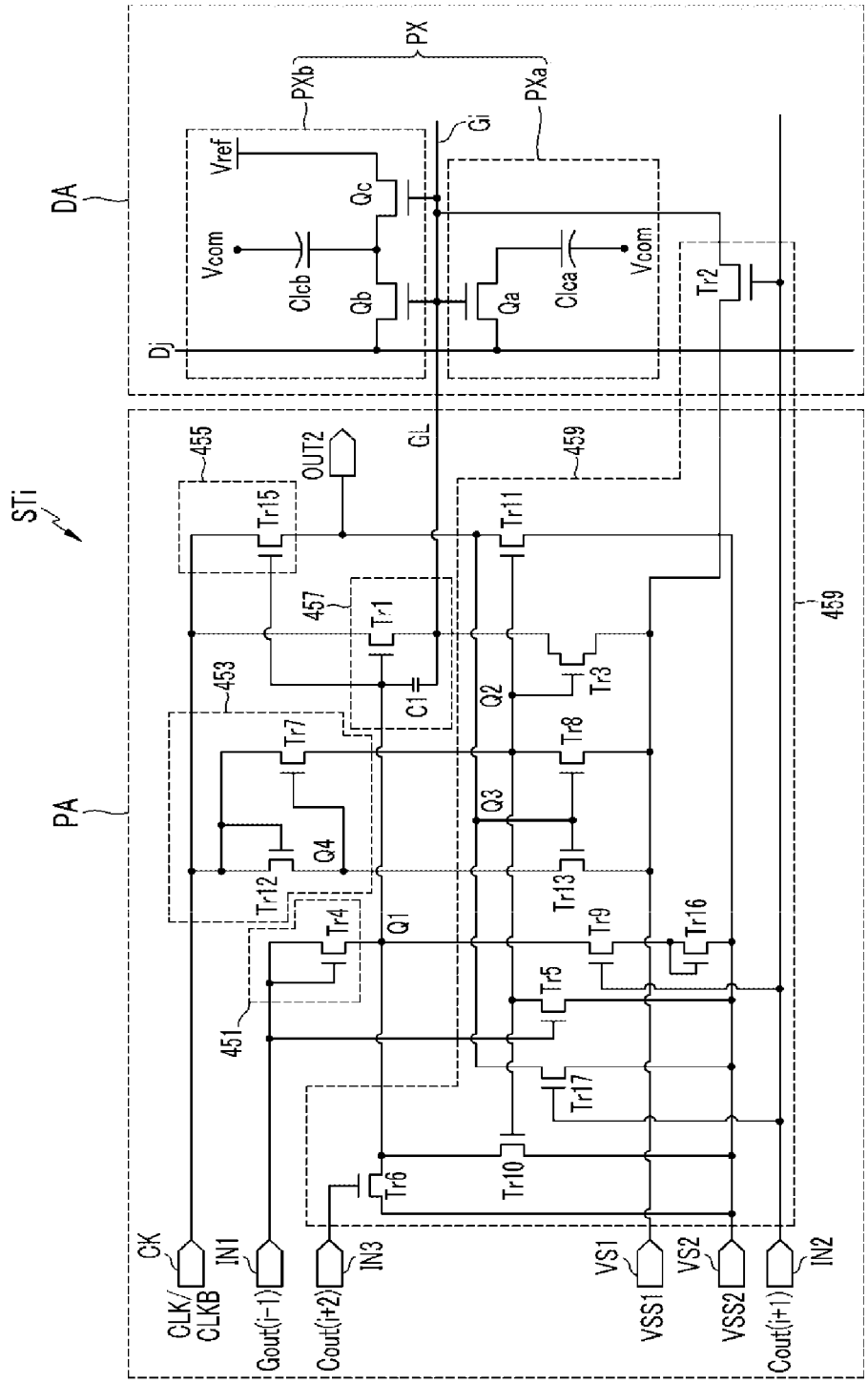
FIG. 10 is a detailed circuit diagram of a stage of a gate lines driver according to another exemplary embodiment.

As described, if at least a second portion (420) of the gate lines driver 400 is disposed in the display area DA, and is so denoted in FIG. 10. By structuring the main stages to have respective portions thereof (e.g., Tr2) disposed in the display area (DA), the area of the peripheral area PA may be further reduced.

Next, one example of the display device according to the exemplary embodiment shown in FIG. 9 will be described with reference to FIG. 10.

FIG. 10 is a circuit diagram of one stage of a gate lines driver according to an exemplary embodiment of the present invention.

Referring to FIG. 10, in the display device according to an exemplary embodiment of the present invention as a liquid crystal display, the display panel 300 includes a display area DA and a peripheral area PA near the display area DA.

In the display area DA, a plurality of pixels PX and the gate lines Gi and data lines Dj are formed.

Each pixel PX includes a first switching element Qa, a second switching element Qb, and a third switching element Qc, and the first liquid crystal capacitor Clca and the second liquid crystal capacitor Clcb. The first switching element Qa, the second switching element Qb, and the third switching element Qc may be three-terminal elements such as thin film transistors. The control terminal of the first switching element Qa and the second switching element Qb is connected to the gate line Gi, the input terminal is connected to the data line Dj, the output terminal of the first switching element Qa is connected to the first liquid crystal capacitor Clca, and the output terminal of the second switching element Qb is connected to the second liquid crystal capacitor Clcb. The control terminal of the third switching element Qc is connected to the gate line Gi, the input terminal is connected to the reference voltage Vref, and the output terminal is connected to the output terminal of the second liquid crystal capacitor Clcb. The first liquid crystal capacitor Clca may be connected between the first switching element Qa and the common voltage Vcom. One terminal of the second liquid crystal capacitor Clcb may be connected to the second and third switching elements Qc, and the other terminal may be connected to the common voltage Vcom.

One stage STi included in the gate lines driver 400 according to the present exemplary embodiment as the main stage connected to the gate line Gi may have substantially the same structure as the exemplary embodiment shown in FIG. 7. However, the first output terminal OUT1 outputting the gate signal Gout(i) is not separately shown in FIG. 10 and the corresponding position is directly connected to and as extending distributively along the gate line Gi.

In the present exemplary embodiment, the second thin film transistor Tr2 of the stage STi may be positioned as extending into or within the display area DA, and the other thin film transistors Tr1, Tr3, Tr17 may be disposed in the peripheral area PA. According to an exemplary embodiment of the present embodiment, the second thin film transistor Tr2 may be disposed in an inter-row area under a row of pixels PX (represented as having subpixels PXa and PXb). A ratio W/L of the channel width W to the channel length L of the second thin film transistor Tr2 may be larger than the first switching element Qa, the second switching element Qb, and the third switching element Qc.

If the gate signal applied to the gate line Gi connected to the stage STi is the gate-on voltage, the first switching element Qa, the second switching element Qb, and the third switching element Qc connected thereto are turned on. Accordingly, the data voltage applied to the data line Dj is applied to the first liquid crystal capacitor Clca and the second liquid crystal capacitor Clcb through the turned on first switching element Qa and second switching element Qb. Accordingly, the output terminal voltage of the first switching element Qa is the same as the data voltage, however the output terminal voltage of the second switching element Qb is different from the data voltage. This is because the second switching element Qb and the third switching element Qc that are coupled in series are connected between the data voltage and the reference voltage Vref, thereby functioning as a resistive ladder dividing the data voltage. Accordingly, the voltage applied to the second liquid crystal capacitor Clcb is smaller than the voltage applied to the first liquid crystal capacitor Clca. Accordingly, the voltage charged to the first liquid crystal capacitor Clca is different from the voltage charged to the second liquid crystal capacitor Clcb. The voltage charged to the first liquid crystal capacitor Clca is different from the voltage charged to the second liquid crystal capacitor Clcb such that the inclinations of the liquid crystal molecules are different in the first subpixel PXa corresponding to the first liquid crystal capacitor Clca and the second subpixel PXb corresponding to the second liquid crystal capacitor Clcb are different, and thereby the luminance of two subpixels PXa and PXb are different. Accordingly, the liquid crystal display including the pixels PX of the above-described operation may have excellent lateral visibility.

The gate lines driver 400 of the display device according to the exemplary embodiment shown in FIG. 7 to FIG. 10 requires two or more dummy stages STd1 and STd2. Accordingly, the number of dummy stages STd1-STdp may be changed according to the driving method of the gate lines driver 400. For example, in a case of previously charging the pixel PX by overlapping a charging time of two or more neighboring pixels, two or more pairs of clock signals may be required, and in this case, four or more dummy stages may be required.

Next, a display device according to another exemplary embodiment of the present disclosure of invention will be described with reference to FIG. 11, FIG. 12, and FIG. 13.

Figure 11:
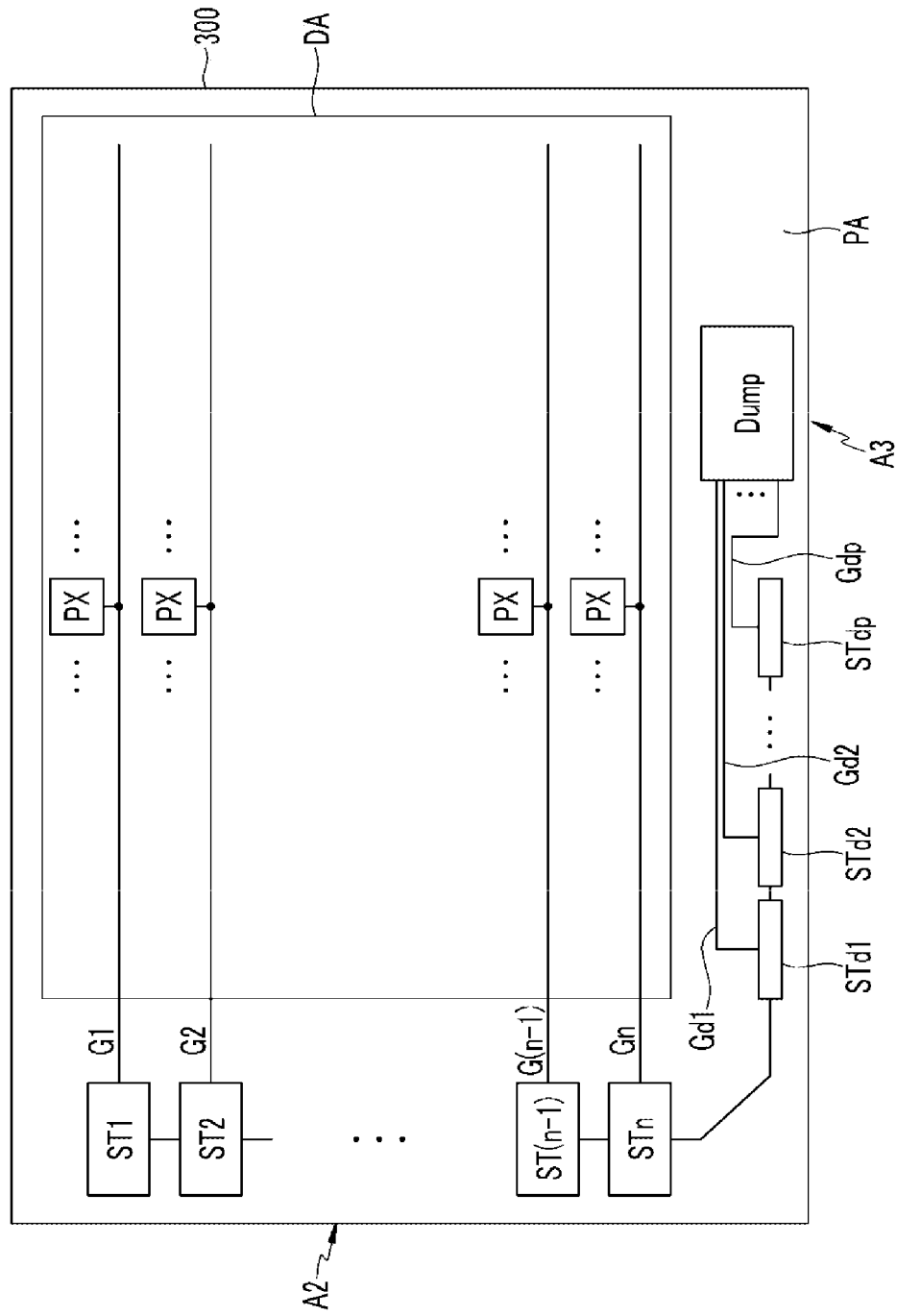
FIG. 11 is a block-level layout view of a display panel included in a display device according to an exemplary embodiment.
Figure 12:
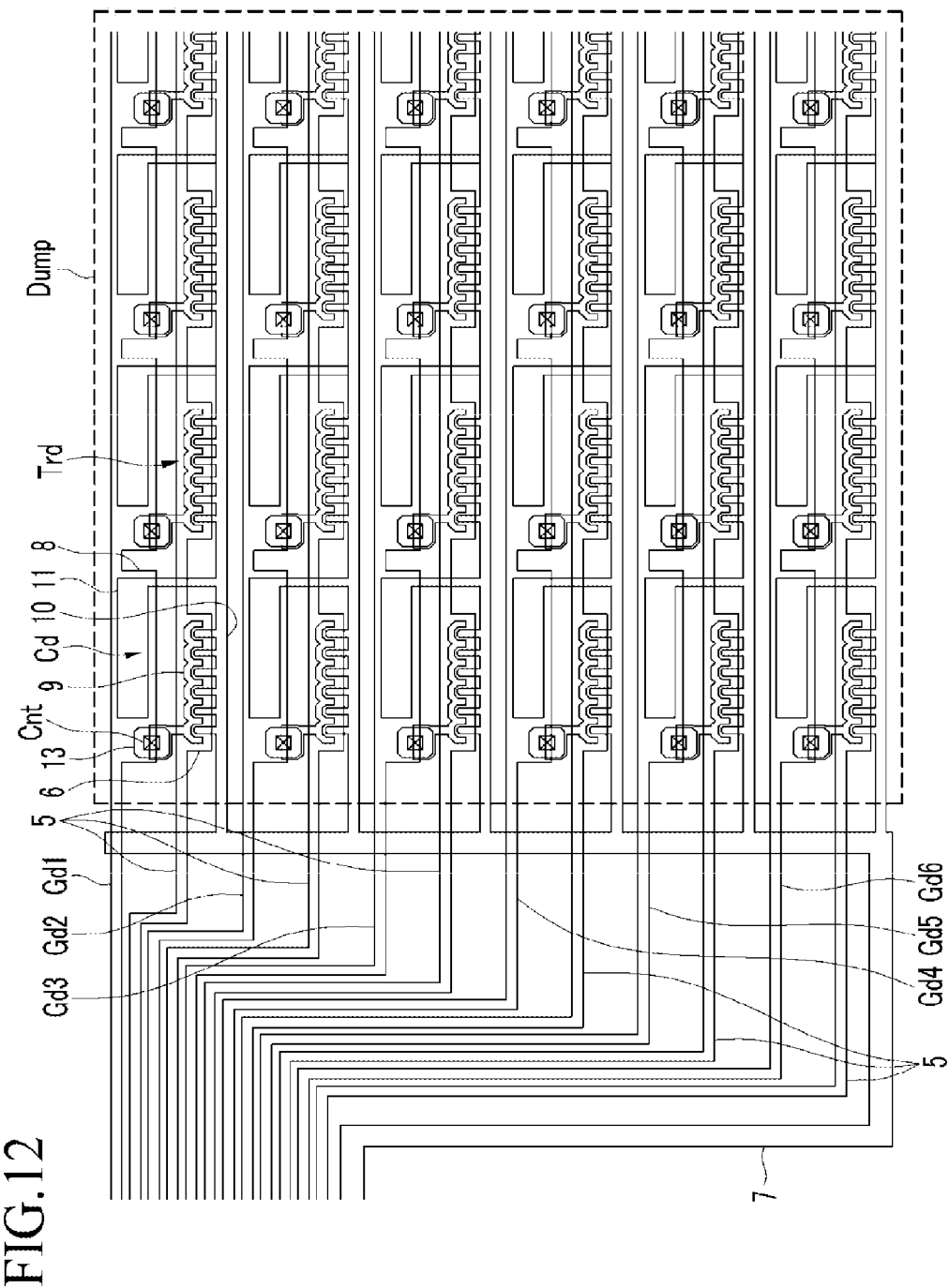
FIG. 12 is a layout view partially showing a display panel included in a display device according to an embodiment.
Figure 13:
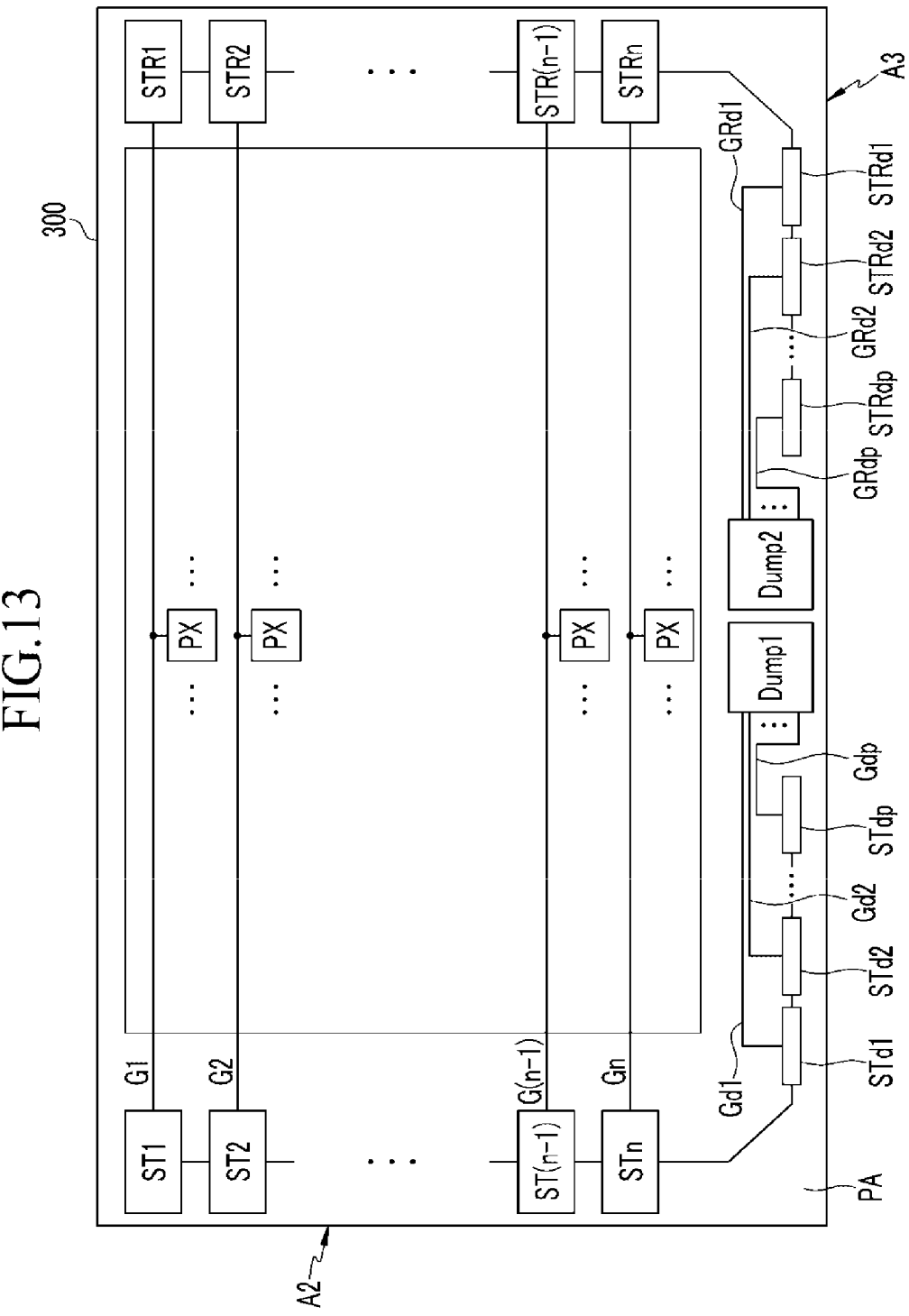
FIG. 13 is a layout view of a display panel included in a display device according to another exemplary embodiment.

FIG. 11 is a layout view of a display panel included in a display device according to an exemplary embodiment of the present invention, FIG. 12 is a layout view partially showing a display panel included in a display device according to an exemplary embodiment of the present invention, and FIG. 13 is a layout view of a display panel included in a display device according to an exemplary embodiment of the present invention.

The display device according to the present exemplary embodiment is substantially the same as most of the display device of the several previous exemplary embodiments.

Referring to FIG. 11, the display device according to an exemplary embodiment further includes a dummy pattern, Dump positioned in the peripheral area PA at the side of the third edge A3 of the display panel 300 and connected to each of the dummy stages STd1-STdp. The dummy pattern Dump may be adjacent to the final dummy stage STdP.

Each of the dummy stages STd1-STdp may be connected to the dummy pattern Dump through each of the dummy gate lines Gd1, Gd2, . . . Gdp. In detail, as described above, each of the dummy stages STd1-STdp includes the first output terminal outputting the dummy gate signal, and the first output terminal is respectively connected to the dummy pattern Dump through the dummy gate lines Gd1, Gd2, . . . , Gdp.

FIG. 12 shows an example in which the number of dummy stages STd1-STdp is six. Referring to FIG. 12, the dummy pattern Dump includes electric elements connected to each of the dummy gate lines Gd1, Gd2, . . . , Gdp such as a plurality of dummy capacitors Cd and a plurality of dummy thin film transistors Trd, and first dummy wiring 5 and second dummy wiring 7 connected to the dummy capacitor Cd and the dummy thin film transistor Trd may be further included.

Each of the dummy gate lines Gd1, Gd2, . . . , Gdp includes an expansion 8 forming one terminal of the dummy capacitor Cd.

The first dummy wiring 5 may extend parallel to the dummy gate lines Gd1, Gd2, . . . , Gdp and may be disposed under each of the dummy gate lines Gd1, Gd2, . . . , Gdp. The first dummy wiring 5 may include a plurality of expansions 6. The dummy gate lines Gd1, Gd2, . . . Gdp and the first dummy wiring 5 may include a common thin film formed with a same layer during manufacture.

The second dummy wiring 7 may be positioned with a different layer from the dummy gate lines Gd1, Gd2, . . . , Gdp and the first dummy wiring 5. The second dummy wiring 7 includes a portion extending toward the expansion 6 of the first dummy wiring 5, a plurality of input and output electrodes 10 overlapping each expansion 6, and an expansion 11 overlapping each expansion 8 of the dummy gate lines Gd1, Gd2, . . . , Gdp thereby forming the dummy capacitor Cd. The input and output electrode 10 faces an island electrode 9 on the expansion 6 of the first dummy wiring 5. The island electrode 9 may be electrically connected to the expansion 8 of the dummy gate line Gd1, Gd2, . . . , Gdp through the connecting member 13 in the contact hole Cnt.

The expansion 6 of one first dummy wiring 5 and the input and output electrode 10 overlapping thereto, and the island electrode 9, may form one dummy thin film transistor Trd together. Each of the dummy thin film transistors Trd may include a plurality of unit thin film subtransistors connected to each other and including each a channel region.

In this way, if the dummy gate lines Gd1, Gd2, . . . , Gdp are connected to a plurality of dummy thin film transistors Trd and dummy capacitors Cd of the dummy pattern Dump, for emulating the loads that the main stages drive. In other words, the output signals of the dummy stages STd1-STdp such as the transmission signal or the gate signal may have substantially the same or equivalent loading as have the output signal of the main stages ST1-STn, and thereby the main stages ST1-STn may be normally operated. For this, to provide the appropriate resistance to the output signal of the dummy stage STd1-STdp, the number, size, and density of the plurality of dummy thin film transistors Trd and dummy capacitors Cd included in the dummy pattern Dump may be appropriately controlled.

Referring to FIG. 13, the display device according to the present exemplary embodiment is substantially the same as most of the display device according to the exemplary embodiment shown in FIG. 5, however in addition to the first dummy pattern Dump1, there is a second dummy pattern Dump2 positioned in the peripheral area PA as the side of the third edge A3 of the display panel 300. The first dummy loads pattern Dump1 is connected to each of the dummy stages STd1-STdp of the first gate lines driver 400a and the second dummy loads pattern Dump2 is connected to each of the dummy stage STRd1-STRdp of the second gate lines driver 400b. The first output terminal outputting the dummy gate signal of the dummy stage STd1-STdp may be connected to the first dummy pattern Dump1 through the dummy gate lines Gd1, Gd2, . . . , Gdp, and the first output terminal outputting the dummy gate signal of the dummy stage STRd1-STRdp may be connected to the second dummy pattern Dump2 through the dummy gate lines GRd1, GRd2, . . . , GRdp.

The first dummy pattern Dump1 may be adjacent to the final dummy stage STdp and the second dummy pattern Dump2 may be adjacent to the final dummy stage STRdp. The first and second dummy patterns Dump1 and Dump2 may be adjacent to each other in the peripheral area PA of the third edge A3 of the display panel 300.

The dummy stage STd1-STdp and the first dummy pattern Dump1, and the dummy stage STRd1-STRdp and the second dummy pattern Dump2, according to the exemplary embodiment shown in FIG. 13 may have substantially the same structure as the exemplary embodiment shown in FIG. 12.

While this disclosure of invention has been described in connection with what are presently considered to be practical exemplary embodiments, it is to be understood that the disclosure of invention is not limited to the disclosed embodiments, but, on the contrary, is intended to cover various modifications and equivalent arrangements included within the spirit and scope of the present teachings.

What is claimed is:

1. A display panel having a first edge extending in a first direction and a second edge extending in a second direction that is different from the first direction, wherein the display panel is subdivided into a display area and a peripheral area and comprises:

a plurality of gate lines extending substantially in the second direction in the display area; and a gate driver including a plurality of main stages sequentially arranged in the first direction in the peripheral area and configured for outputting respective gate signals to respective ones of the gate lines, wherein the gate driver further includes one or more dummy stages that are not connected to the gate lines of the display area and disposed in a row area alongside the second edge, wherein the main stages arranged alongside the first edge;

wherein at least one of the main stages connects to at least one dummy stage of the one or more dummy stages, wherein one of the main stages includes a first transistor including more than one first unit subtransistor connected in parallel with each other, and one of the one or more dummy stages includes a second transistor corresponding to the first transistor and including more than one second unit subtransistor connected in parallel with each other, and wherein a channel width of the first unit subtransistor is different from a channel width of the second unit subtransistor.

2. The display panel of claim 1, wherein the second transistor performs a substantially same function as the first transistor.

3. The display panel of claim 1, wherein a number of the more than one first unit subtransistor included in the first transistor is different from a number of the more than one second unit subtransistor included in the second transistor.

4. The display panel of claim 1, wherein
an elongation direction of an elongated channel of the first unit subtransistor is different from an elongation direction of an elongated channel of the second unit subtransistor.

5. The display panel of claim 4, wherein
the elongation direction of the elongated channel of the second unit subtransistor is the second direction.

6. The display panel of claim 1, wherein
a length in the second direction of one of the one or more dummy stages is longer than a length in the first direction of one main stage of the main stages and a length in the second direction of the one main stage.

7. The display panel of claim 6, wherein
the channel width of the first unit subtransistor is less than the channel width of the second unit subtransistor.

8. The display panel of claim 1, further comprising
a control signal line configured for transmitting a control signal to the plurality of main stages and to the at least one dummy stage, wherein the control signal line includes a first portion extending along the first edge, a second portion extending along the second edge, and a corner portion connecting the first portion to the second portion, and wherein an extending direction of the corner portion forms an oblique angle with the first direction and with the second direction.

9. The display panel of claim 8, wherein
the control signal line comprises at least one selected from the group consisting of a clock signal line, a scanning start signal line, and a low voltage line.

10. The display panel of claim 9, wherein
the at least one of the main stages connects to the at least one dummy stage through the corner portion of the control signal line.

11. The display panel of claim 8, further comprising
an alignment key positioned between the corner portion of the control signal line and the first edge or the second edge of the display panel.

12. The display panel of claim 1, wherein
the display area is configured for displaying an image and the peripheral area is disposed around the display area, and at least a portion of a plurality of transistors included in a main stage is positioned in the display area.

13. The display panel of claim 1, wherein one of the main stages includes a first plurality of transistors, and one of the one or more dummy stages includes a second plurality of transistors, and wherein a relative arrangement of the first plurality of transistors is different from a relative arrangement of the second plurality of transistors.

14. The display panel of claim 1, further comprising
a dummy loads pattern connected to the one or more dummy stages and neighboring the one or more dummy stages in the row area.

15. The display panel of claim 14, wherein
one dummy stage of the one or more dummy stage includes an output terminal outputting a dummy gate signal, and the dummy loads pattern includes one or more electric load elements connected to the output terminal of the dummy stage.

16. The display panel of claim 1, wherein
the display panel further includes a third edge facing the first edge, and the gate driver further include a plurality of main stages arranged in a column along the third edge and connected to the plurality of gate lines, and at least one dummy stage connected to at least one of the plurality of main stages arranged along the third edge.

17. The display panel of claim 1, wherein
the display area is configured for displaying an image and the peripheral area is disposed around the display area, and the gate driver includes a third portion positioned in the peripheral area and a fourth portion positioned in the display area.

18. The display panel of claim 17, wherein
the fourth portion includes at least one active element.

19. The display panel of claim 1, wherein
a length in the first direction of one dummy stage of the one or more dummy stages is less than a length in the first direction of one main stage of the main stages.

20. The display panel of claim 19, wherein
an area of the one dummy stage is different from an area of the one main stage.

21. The display panel of claim 19, wherein
the one or more dummy stages include at least two dummy stages having different areas from each other.

22. The display panel of claim 1, wherein
a length in the first direction of one dummy stage of the one or more dummy stages is less than a length in the second direction of the one dummy stage.

* * * * *